US012076992B2

(12) United States Patent
Masuda

(10) Patent No.: US 12,076,992 B2
(45) Date of Patent: Sep. 3, 2024

(54) LIQUID DISCHARGE HEAD, LIQUID DISCHARGE DEVICE, AND LIQUID DISCHARGE APPARATUS

(71) Applicant: Toshiaki Masuda, Kanagawa (JP)

(72) Inventor: Toshiaki Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 128 days.

(21) Appl. No.: 17/964,963

(22) Filed: Oct. 13, 2022

(65) Prior Publication Data

US 2023/0146297 A1 May 11, 2023

(30) Foreign Application Priority Data

Nov. 9, 2021 (JP) ................................. 2021-182690

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
CPC ...... B41J 2/161; B41J 2/1623; B41J 2/16233; B41J 2/1628; B41J 2/1631; B41J 2/1632; B41J 2/1642; B41J 2/1643; B41J 2/1645; B41J 2/1646; B41J 2002/14491; B41J 2202/11
See application file for complete search history.

(56) References Cited

U.S. PATENT DOCUMENTS

2010/0231650 A1* 9/2010 Mita .................... B41J 2/14201 347/48
2015/0028125 A1* 1/2015 Fukuda ................ B41J 2/14201 239/102.2
2015/0070444 A1 3/2015 Ishimori et al.
2019/0270310 A1 9/2019 Masuda et al.
2021/0039393 A1 2/2021 Mizukami et al.
2021/0162759 A1 6/2021 Miwa et al.
2021/0252862 A1 8/2021 Masuda
2022/0097373 A1 3/2022 Masuda
(Continued)

FOREIGN PATENT DOCUMENTS

JP 11-115184 4/1999
JP 11-157062 6/1999
JP 11-179902 7/1999
(Continued)

*Primary Examiner* — Anh T Vo
(74) *Attorney, Agent, or Firm* — XSENSUS LLP

(57) ABSTRACT

A liquid discharge head includes: a chamber substrate; a diaphragm on the chamber substrate; a lower electrode on the diaphragm; a piezoelectric member on the lower electrode; an upper electrode on the piezoelectric member; wiring electrically connected to the upper electrode to transmit driving signal to the piezoelectric member; and a nozzle substrate having a nozzle. The chamber substrate includes an individual chamber facing the diaphragm, the individual chamber has polygonal shape having four or more sides, the piezoelectric member has polygonal shape having four or more sides, the wiring covers a middle point of a first side of the four or more sides of the individual chamber, and a distance A is smaller than a distance B.

11 Claims, 11 Drawing Sheets

(56) References Cited

U.S. PATENT DOCUMENTS

2022/0242123 A1 8/2022 Hirabayashi et al.

FOREIGN PATENT DOCUMENTS

| | | |
|---|---|---|
| JP | 2003-276196 | 9/2003 |
| JP | 2004-106475 | 4/2004 |
| JP | 2007-296864 | 11/2007 |
| JP | 2012-253087 | 12/2012 |
| JP | 2014-073629 | 4/2014 |
| JP | 2015-006758 | 1/2015 |
| JP | 2017-094517 | 6/2017 |

* cited by examiner

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-182690, filed on Nov. 9, 2021, in the Japan Patent Office, the entire disclosure of which is hereby incorporated by reference herein.

BACKGROUND

Technical Field

The present embodiment relates to a liquid discharge head, a liquid discharge device, and a liquid discharge apparatus.

Related Art

There is a technique in which a piezoelectric member is applied as a drive source for an actuator in a liquid discharge head.

Such a liquid discharge head includes a nozzle plate, a chamber substrate having an individual chamber and a liquid supply chamber, a diaphragm, and a piezoelectric member. The individual chamber has a width wider in the vicinity of a region of a nozzle than other regions. A reinforcement including at least an insulating film is formed on the piezoelectric member corresponding to the vicinity of the region of the nozzle. Thus, a stable and uniform liquid droplet can be discharged.

An individual chamber and a piezoelectric member are often formed in a rectangular shape in plan view. In this case, due to stress to the diaphragm in long term driving, the diaphragm is likely to be broken.

SUMMARY

A liquid discharge head includes: a chamber substrate; a diaphragm on the chamber substrate; a lower electrode on the diaphragm; a piezoelectric member on the lower electrode; an upper electrode on the piezoelectric member; wiring electrically connected to the upper electrode to transmit driving signal to the piezoelectric member; and a nozzle substrate having a nozzle. The chamber substrate includes an individual chamber facing the diaphragm, the individual chamber has polygonal shape having four or more sides, the piezoelectric member has polygonal shape having four or more sides, the wiring covers a middle point of a first side of the four or more sides of the individual chamber, and a distance A is smaller than a distance B, where the distance A is between a first end portion of the individual chamber and a second end portion of the piezoelectric member in a second side of the four or more sides in which a distance L is the largest, and a distance B is between a third end portion of the individual chamber and a fourth end portion of the piezoelectric member in a third side of the four or more sides in which the distance L is the smallest, and the distance L is a distance from the middle point of the first side to each of middle points of the four or more sides other than the first side.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
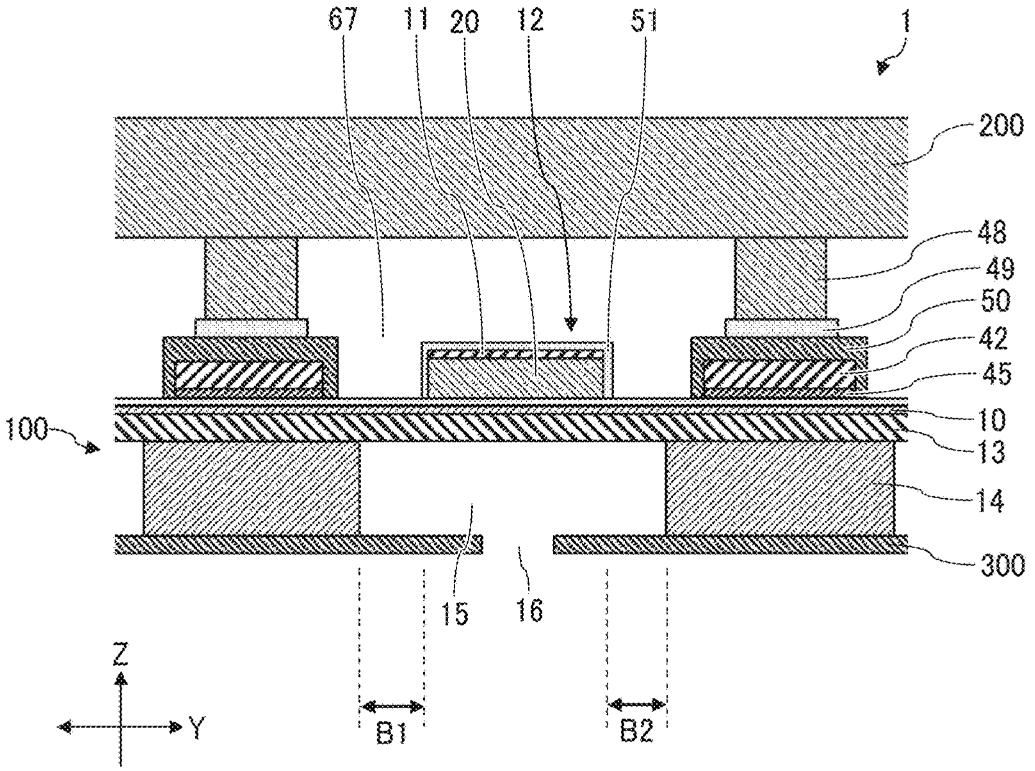
FIG. 1 is a schematic cross-sectional view in the liquid-chamber lateral direction of an example of a liquid discharge head according to the present embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below: As used herein, the singular forms "a," "an," and "the" are intended to include the plural forms as well, unless the context clearly indicates otherwise.

A liquid discharge head, a liquid discharge device, and a liquid discharge apparatus according to the present embodiment will be described below with reference to the drawings. Note that the present embodiment is not limited to the following embodiments and thus other embodiments, additions, modifications, and deletions can be made within the scope conceivable by those skilled in the art. Any aspects that achieve the function and effect of the present embodiment are to be included in the scope of the present embodiment.

[Liquid Discharge Head]

A liquid discharge head according to the present embodiment includes: a chamber substrate; a diaphragm on the chamber substrate; a lower electrode on the diaphragm; a piezoelectric member on the lower electrode; an upper electrode on the piezoelectric member; wiring for driving the piezoelectric member; and a nozzle substrate having a nozzle, in which the chamber substrate has an individual chamber opposite the piezoelectric member through the diaphragm, the individual chamber and the piezoelectric member are each polygonal with four sides or more in plan view; the wiring overlaps part of the individual chamber and overlaps at least a middle point of one side of a plurality of sides of the individual chamber in plan view; and when the middle point is defined as a base point, a distance from the base point to a middle point of another side of the individual chamber in plan view is defined as a distance L, a distance between an end portion of the individual chamber and an end portion of the piezoelectric member based on a side of which the distance L is largest is defined as A, and a distance between an end portion of the individual chamber and an end portion of the piezoelectric member based on a side of which the distance L is smallest is defined as B, an expression: A<B is satisfied.

In a case where a plurality of the sides of which the distance L is largest is present, the expression is satisfied regarding all corresponding sides, and in a case where a plurality of the sides of which the distance L is smallest is present, the expression is satisfied regarding all corresponding sides.

An example of the liquid discharge head according to the present embodiment will be described. Herein, given will be a case where an individual chamber and a piezoelectric member are each rectangular in shape in plan view:

FIG. 1 is a schematic cross-sectional view of the example of the liquid discharge head according to the present embodiment, along the lateral direction of an individual chamber (Y direction).

Figure 2:
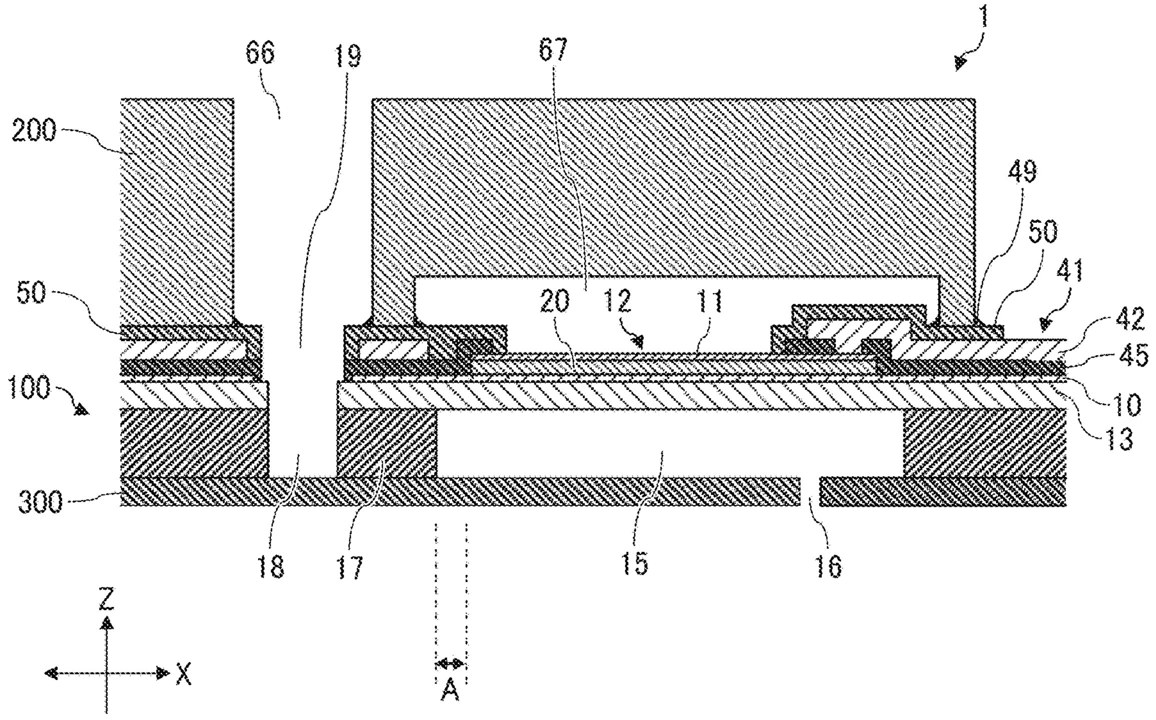
FIG. 2 is a schematic cross-sectional view in the liquid-chamber longitudinal direction of the example of the liquid discharge head according to the present embodiment.

FIG. 2 is a schematic cross-sectional view of the example of the liquid discharge head according to the present embodiment, along the longitudinal direction of the individual chamber (X direction).

A liquid discharge head 1 according to the present embodiment includes an actuator substrate 100 (chamber substrate), a diaphragm 13 on the chamber substrate, a lower electrode 10 on the diaphragm 13, a piezoelectric member 20 on the lower electrode 10, an upper electrode 11 on the piezoelectric member 20, wiring 42 for driving the piezoelectric member 20, and a nozzle substrate 300 having a nozzle 16.

The actuator substrate 100 has an individual chamber 15 (also referred to as a pressurization chamber or liquid chamber) opposite the piezoelectric member 20 through the diaphragm 13.

The individual chamber 15 is in communication with the nozzle 16, and such individual chambers 15 are provided. The individual chambers 15 each are separated by a partition 14.

The piezoelectric member 20 and the electrodes are also referred to as a piezoelectric element 12.

As the piezoelectric member 20, for example, lead zirconate titanate (PZT) can be used, and thus the piezoelectric member 20 is also referred to as a PZT film or PZT. The piezoelectric member 20 is sandwiched between the lower electrode 10 and the upper electrode 11. The lower electrode 10 may be a common electrode or the upper electrode 11 may be a common electrode. Applied voltage through the wiring 42 causes the piezoelectric element 12 to generate liquid discharge energy.

In the present embodiment, the actuator substrate 100 and the nozzle substrate 300 are joined together, so that the actuator substrate 100 and the nozzle substrate 300 form the individual chamber 15. In order to join such substrates together, for example, adhesive 49 can be used.

A support substrate 200 is joined with the actuator substrate 100. The support substrate 200 has a liquid supply port 66. Liquid (e.g., recording liquid or ink) is supplied from outside through the liquid supply port 66. Then, the liquid passes through a common liquid supply path 19 and a common chamber 18 and then is supplied to the individual chamber 15 through a fluid resistant portion 17.

In the liquid discharge head 1 according to the present embodiment, for example, with each individual chamber 15 filled with liquid (recording liquid or ink), based on image data, a pulse voltage is applied to the upper electrode 11 corresponding to any nozzle 16 through which the ink is to be discharged. As the pulse voltage, for example, a pulse voltage of 20 V can be selected. For example, an oscillating circuit applies such a pulse voltage. The wiring 42 is in connection with the upper electrode 11 through a connection hole that an inter-layer insulating film 45 has. The pulse voltage is applied to the upper electrode 11 through the wiring 42.

Due to electrostrictive effect based on the applied pulse voltage, the piezoelectric member 20 contracts parallel to the diaphragm 13. Thus, the diaphragm 13 bends toward the individual chamber 15. Thus, the internal pressure of the individual chamber 15 rises rapidly, so that the ink is discharged through the nozzle 16 in communication with the individual chamber 15.

After the application of the pulse voltage, the piezoelectric member 20 having contracted returns to the original state, so that the diaphragm 13 having bent returns to the original position. Thus, the inside of the individual chamber 15 is lower in pressure than the inside of the common chamber 18, so that ink is supplied from the common chamber 18 to the individual chamber 15 through the fluid resistant portion 17. Ink is supplied to the common chamber 18 after passing the common liquid supply path 19 from outside through the liquid supply port 66.

Repetition of the above enables continuous discharging of liquid droplets, leading to formation of an image on a recording medium disposed opposite the liquid discharge head. Such a recording medium is also referred to as a medium on which recording is to be made or medium. For example, plain paper or a non-permeative recording medium can be used.

Example 1

Next, the example of the liquid discharge head according to the present embodiment will be further described with plan views.

Figure 3A:
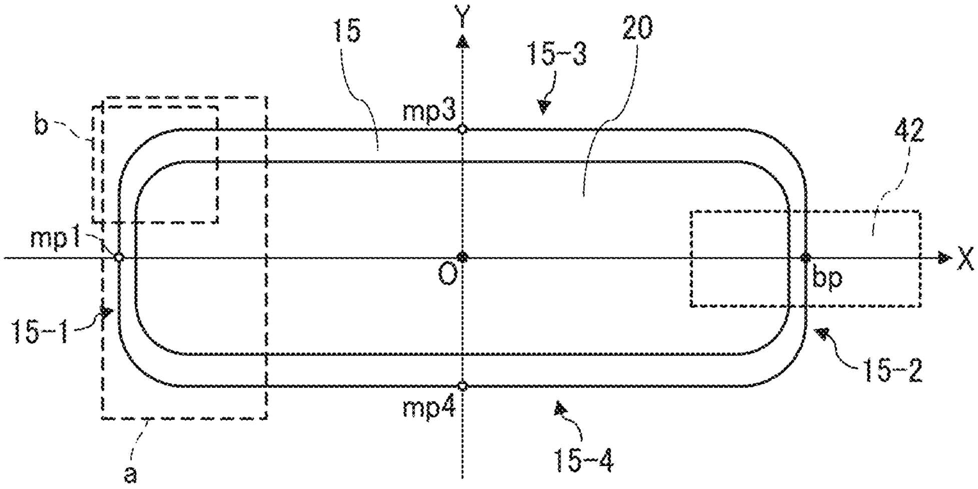
FIG. 3A is a schematic plan view of the example of the liquid discharge head according to the present embodiment.

FIG. 3A is a schematic plan view of a main part of the example of the liquid discharge head according to the present embodiment, namely, an explanatory view of the configuration of the main part in the stack direction of the layers of the piezoelectric element 12.

As illustrated in FIG. 3A, the individual chamber 15 in the present embodiment is rectangular in shape in plan view and has two mutually opposite shorter sides and two mutually opposite longer sides. In the figure, the center of the individual chamber 15 is denoted with O. The longitudinal direction and lateral direction of the individual chamber 15 correspond, respectively, to the X axis and the Y axis.

FIG. 1 is a schematic cross-sectional view along the lateral direction of the individual chamber 15 (Y-axis direction).

FIG. 2 is a schematic cross-sectional view along the longitudinal direction of the individual chamber 15 (X-axis direction).

Note that the shape of the individual chamber 15 in plan view is not necessarily rectangular and may be polygonal. As an advantage, a rectangular individual chamber 15 is easy to form.

The mutually opposite shorter sides of the individual chamber 15 illustrated in FIG. 3A are indicated as sides 15-1 and 15-2. The mutually opposite longer sides are indicated as sides 15-3 and 15-4. In the present embodiment, the wiring 42 is formed on the side of location of one of the two shorter sides of the individual chamber 15 (side of location of the side 15-2) (also refer to FIG. 2). The side of location of the side 15-2 is also referred to as the side of location of one of the shorter sides, and the side of location of the side 15-1 is also referred to as the side of location of the other shorter side.

Note that, referring to FIG. 3A, the wiring 42 is schematically illustrated with a broken line. Thus, for example, the shape of the wiring 42 is not limited to the illustration.

In the present embodiment, the region of the individual chamber 15 is larger than the region of the piezoelectric member 20. Such a relationship is illustrated in FIGS. 1 and 2.

The wiring 42 overlaps part of the individual chamber 15. The wiring 42 overlaps at least the middle point of one side of the plurality of sides of the individual chamber 15 in plan view; and the middle point is defined as a base point "bp". In the figure, the middle points of the other three sides of the individual chamber 15 (sides except the side having the base point bp) are denoted with "mp1". "mp3", and "mp4". Note that "mp" represents middle point and mp2 corresponds to bp.

Figure 3B:
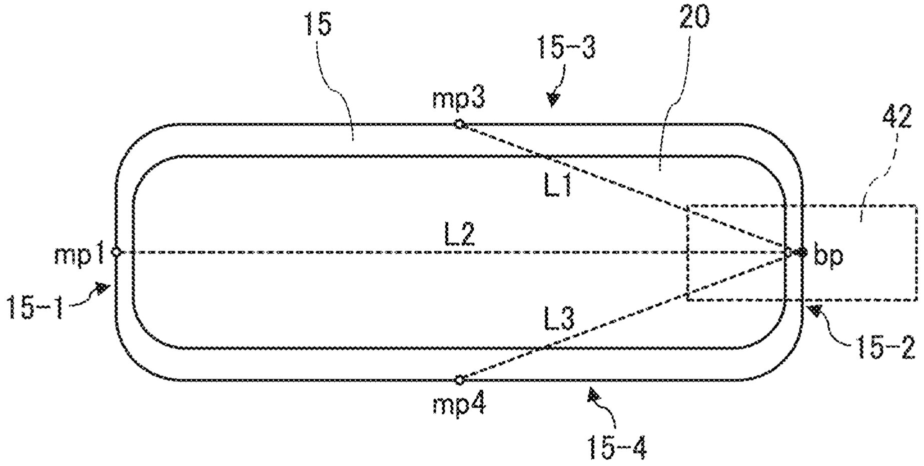
FIG. 3B is another schematic plan view of the example of the liquid discharge head according to the present embodiment.

FIG. 3B is a schematic plan view for describing the distance L from the base point bp to the middle point mp of a side of the individual chamber 15. In the present embodiment, the distance from the base point bp to the middle point of another side of the individual chamber 15 in plan view is defined as the distance L. The another side of the individual chamber 15 is different from the side having the base point bp. As illustrated in FIG. 3B, the distance L from the base point bp to the middle point mp1 of the side 15-1 is denoted with LI. The distance L from the base point bp to the middle point mp3 of the side 15-3 is denoted with L3. The distance L from the base point bp to the middle point mp4 of the side 15-4 is denoted with L4.

In the present embodiment, a side of which the distance L is largest and a side of which the distance L is smallest are found. Then, the respective distances between the end portion of the individual chamber 15 and the end portion of the piezoelectric member 20 based on the side of which the distance L is largest and the side of which the distance L is smallest are required to satisfy a predetermined relationship.

In the present embodiment, the distance between the end portion of the individual chamber 15 and the end portion of the piezoelectric member 20 based on the side of which the distance L is largest is defined as A, and the distance between the end portion of the individual chamber 15 and the end portion of the piezoelectric member 20 based on the side of which the distance L is smallest is defined as B. In the present example, the side of which the distance L is largest corresponds to the side 15-1 that is one of the two shorter sides of the individual chamber 15. In the present example, the side of which the distance L is smallest corresponds to the sides 15-3 and 15-4 that are the longer sides of the individual chamber 15.

In the present example, the wiring 42 overlaps the shorter side 15-2 of the individual chamber 15, but this is not limiting. Thus, the wiring 42 may overlap the longer side 15-3 or 15-4 of the individual chamber 15. In this case, the middle point mp3 of the side 15-3 or the middle point mp4 of the side 15-4 serves as the base point bp. Thus, the distance L from the base point bp to the middle point of another side of the individual chamber 15 is examined.

Figure 4:
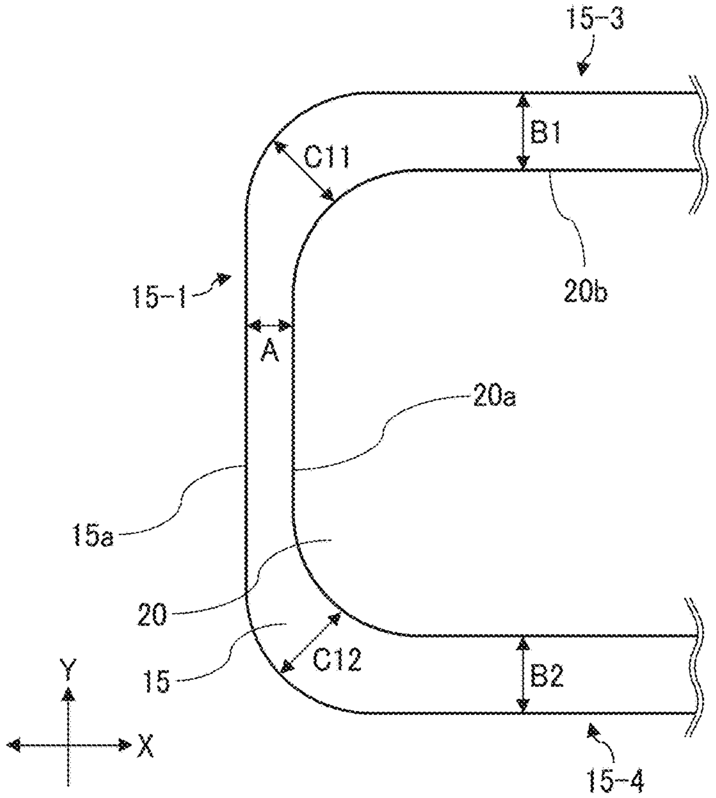
FIG. 4 is an enlarged view of a part surrounded by a broken line "a" in FIG. 3A.

FIG. 4 is an enlarged view of a part surrounded by a broken line "a" in FIG. 3A. As illustrated in FIG. 4, the end portion 20*a* of the piezoelectric member 20 is denoted with reference sign "20*a*" and the end portion 15*a* of the individual chamber 15 is denoted with reference sign "15*a*".

As illustrated in FIG. 4, the distance between the end portion 20*a* of the piezoelectric member and the end portion 15*a* of the individual chamber on the side of location of the other of the two shorter sides of the individual chamber 15 (side of location of the side 15-1) is defined as A. The distance between the end portion 20*a* of the piezoelectric member and the end portion 15*a* of the individual chamber on the side of location of one of the two longer sides of the individual chamber 15 (side of location of the side 15-3) is defined as B1. The distance between the end portion 20*a* of the piezoelectric member and the end portion 15*a* of the individual chamber on the side of location of the other longer side (side of location of the side 15-4) is defined as B2.

Note that, in a case where the distance between the end portion 20*a* of the piezoelectric member and the end portion 15*a* of the individual chamber based on one side of the individual chamber 15 varies in value depending on places, the numerical values at a plurality of places may be averaged to find a mean value. The mean value may be used as the distance between the end portion 20*a* of the piezoelectric member and the end portion 15*a* of the individual chamber. In other words, A and B may be each a mean value.

The relationship between A and B in the present embodiment satisfies the following:

$A<B$. Satisfaction of such a relationship enables an enhancement in reliability without application of tensile stress to the piezoelectric member 20. Furthermore, an increase can be made in the size of a discharge droplet.

In the present embodiment, a plurality of sides of which the distance L is smallest may be provided like the present example. In the present example, the sides 15-3 and 15-4 each correspond to a side of which the distance Lis smallest. In this case, the above expression is satisfied regarding all corresponding sides. That is, the followings are all satisfied: A<B1 and A<B2.

Note that a plurality of sides of which the distance L is largest may be provided. In this case, the following: A<B is satisfied regarding all corresponding sides.

According to the exceptional examination of the inventor, satisfaction of the above relationship between A and B enables acquisition of the above effect, leading to the present embodiment. This will be described below.

In the present example, the individual chamber is rectangular in shape in plan view; and the wiring is formed on the side of location of one of the two shorter sides. In this case, a displacement distribution indicating the displacement of the diaphragm in the longitudinal direction (X-axis direction) is asymmetric. The displacement distribution depends on not only the presence or absence of wiring but also the distance between the end portion of the piezoelectric member and the end portion of the individual chamber. A larger region of the diaphragm in which no piezoelectric member is present with the individual chamber open causes a larger displacement of the diaphragm.

Figure 5:
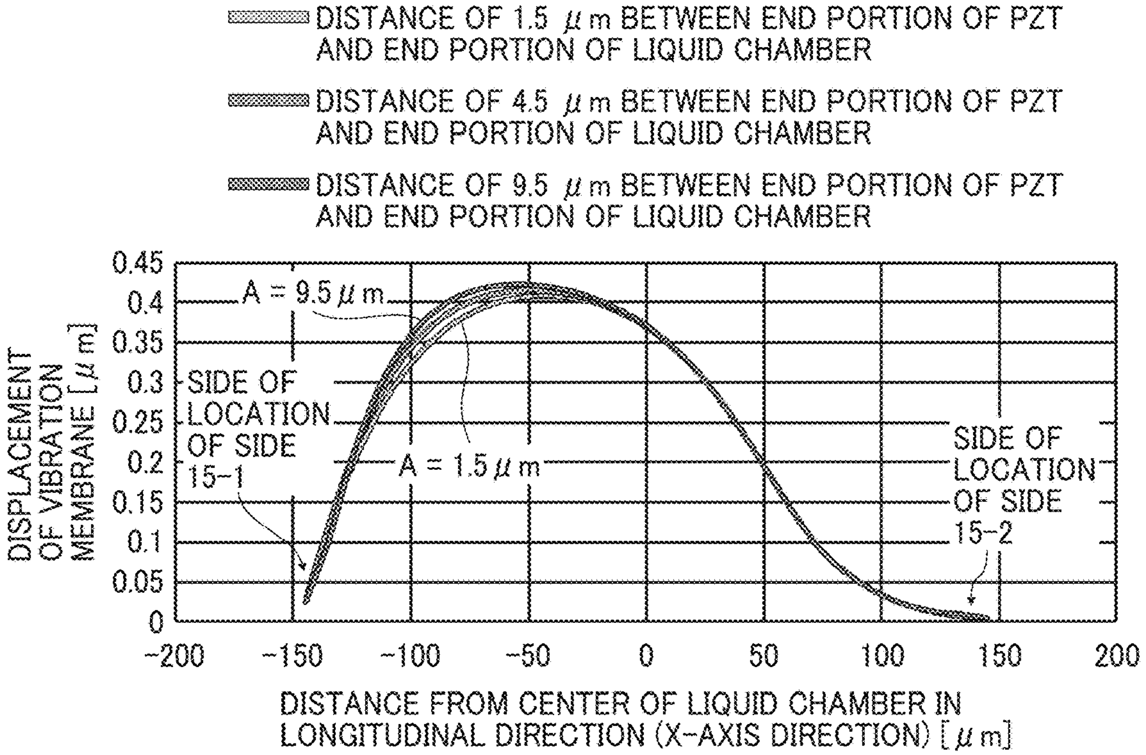
FIG. 5 is an explanatory graph of exemplary displacement of a diaphragm as a function of distance from the center of a liquid chamber in the longitudinal direction of the liquid chamber.

FIG. 5 is a graph of exemplary displacement distributions of the diaphragm with a voltage input. The horizontal axis represents the distance [μm] from the center O of the individual chamber in the longitudinal direction of the individual chamber (X-axis direction). The vertical axis represents the displacement [μm] of the diaphragm. As illustrated in FIG. 5, the displacement distribution of the diaphragm is asymmetric. This is because the wiring is formed on the side of location of one of the shorter sides of the individual chamber.

FIG. 5 illustrates displacement distributions responsive to changes in the distance between the end portion 20*a* of the piezoelectric member and the end portion 15*a* of the individual chamber on the side of location of the other of the shorter sides of the individual chamber 15 (side of location of the side 15-1), namely, changes in A. Herein, the displacement distributions correspond to an A of 1.5 μm, an A of 4.5 μm, and an A of 9.5 μm. A larger value of A causes a larger displacement of the diaphragm in the range of from −50 to −120 μm. That is, between the three examples, the displacement of the vibration is largest when A is 9.5 μm.

This may be because a longer distance between the end portion of the piezoelectric member and the end portion of the individual chamber causes less stress in the longitudinal direction to the diaphragm, leading to a larger displacement of the diaphragm. However, a larger displacement of the diaphragm causes a larger tensile stress to the piezoelectric member, leading to less improvement in the durability of the piezoelectric member. No improvement in the durability of the piezoelectric member results in no enhancement in the reliability of the liquid discharge head. Thus, the value of A is required to be brought to a certain extent.

Meanwhile, a larger amount of a discharge droplet is preferable to an improvement in the print area to drive time. A larger amount of a discharge droplet enables an improvement in discharge characteristics. The distance between the end portion of the piezoelectric member and the end portion of the individual chamber affects the amount of a discharge droplet. A longer distance between the end portion of the piezoelectric member and the end portion of the individual chamber causes a larger displacement of the diaphragm, leading to a larger amount of a discharge droplet. Thus, from the viewpoint of the amount of a discharge droplet, the distance between the end portion of the piezoelectric member and the end portion of the individual chamber is required to be selected appropriately.

However, as described above, the distance between the end portion 20*a* of the piezoelectric member and the end portion 15*a* of the individual chamber on the side of location of the other of the shorter sides of the individual chamber 15 (side of location of the side 15-1), namely, A is preferably not excessively large from the viewpoint of suppression of tensile stress. In other words, the distance between the end portion 20*a* of the piezoelectric member and the end portion 15*a* of the individual chamber in the longitudinal direction (X-axis direction) is preferably not excessively large.

Referring to FIG. 5, a smaller value of A causes the maximum point in displacement closer to the center (X=0) in the longitudinal direction, resulting in a reduction in asymmetry. For example, the maximum point in displacement when A is 1.5 μm is at approximately −50 μm, resulting in a displacement distribution having similarity between the left side and right side with respect to the maximum point in displacement.

In contrast to this, the maximum point in displacement when A is 9.5 μm is at approximately −80 μm, resulting in a displacement distribution larger in difference between the left side and right side with respect to the maximum point in displacement than the displacement distribution when A is 1.5 μm. Thus, the asymmetry is lower when A is 1.5 μm than when A is 9.5 μm. An increase in asymmetry leads a discharge droplet into a bend. From the viewpoint of the above, the distance between the end portion 20*a* of the piezoelectric member and the end portion 15*a* of the individual chamber in the longitudinal direction (X-axis direction) is preferably not excessively large.

Thus, instead of an increase in the distance between the end portion of the piezoelectric member and the end portion of the individual chamber in the longitudinal direction for the purpose of attainment of an amount of discharge droplet, preferably, the above purpose is achieved with a different configuration. Thus, examined has been adjustment of the distance between the end portion 20*a* of the piezoelectric member and the end portion 15*a* of the individual chamber in the lateral direction (Y-axis direction). The distance between the end portion 20*a* of the piezoelectric member and the end portion 15*a* of the individual chamber in the lateral direction (Y-axis direction) has less influence on the displacement of the diaphragm in the longitudinal direction. Thus, it can be thought that the value of the distance can be adjusted in order to attain an amount of discharge droplet.

The inventor performed measurements and examinations with various samples.

Figure 6:
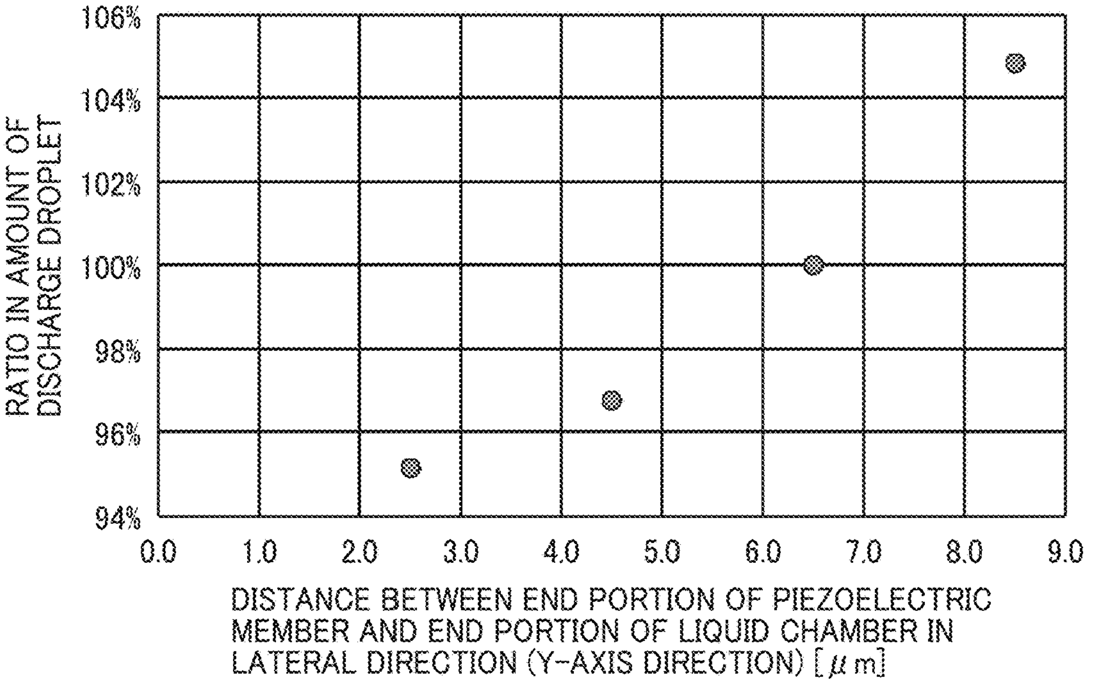
FIG. 6 is an explanatory graph of an exemplary amount of a discharge droplet as a function of distance between the end portion of a piezoelectric member and the end portion of the liquid chamber in the lateral direction of the liquid chamber.

FIG. 6 is a graph of an exemplary relationship between the amount of a discharge droplet and the distance between the end portion 20*a* of the piezoelectric member and the end portion 15*a* of the individual chamber in the lateral direction (Y-axis direction). The horizontal axis represents the distance [μm] between the end portion 20*a* of the piezoelectric member and the end portion 15*a* of the individual chamber in the lateral direction. The vertical axis represents the relative difference of the amount of a discharge droplet to 100% that is the amount of a discharge droplet based on a distance of 6.5 μm between the end portion 20*a* of the piezoelectric member and the end portion 15*a* of the individual chamber in the lateral direction.

Note that the horizontal axis in FIG. 6 corresponds to B1 or B2 in FIG. 4. The graph of FIG. 6 indicates a result of measurement with B1 and B2 equal to each other.

As illustrated in FIG. 6, a larger distance between the end portion 20*a* of the piezoelectric member and the end portion 15*a* of the individual chamber in the lateral direction causes a larger amount of a discharge droplet. This may be because a larger distance between the end portion 20*a* of the piezoelectric member and the end portion 15*a* of the individual chamber in the lateral direction causes a larger displacement of the diaphragm in the lateral direction, leading to a larger amount of a discharge droplet (larger size of a discharge droplet). The inventor further examined what distance between the end portion 20*a* of the piezoelectric member and the end portion 15*a* of the individual chamber in the lateral direction enables acquisition of a satisfied amount of discharge droplet.

The distance between the end portion 20*a* of the piezoelectric member and the end portion 15*a* of the individual chamber was examined in consideration of specific numerical values. As a result, it is found that the relationship between A and B satisfying the following: $A<B$ as described above enables acquisition of an expected effect. It is found that satisfaction of the above relationship enables no application of tensile stress to the piezoelectric member 20 or a reduction in tensile stress, leading to an enhancement in the durability of the piezoelectric member 20 and an enhancement in reliability.

Furthermore, it is found that satisfaction of the above relationship enables a larger amount of a discharge droplet, leading to an improvement in discharge characteristics. According to the present embodiment, the diaphragm can be inhibited from being broken and a larger amount of a discharge droplet can be obtained, so that an improvement in reliability and an improvement in discharge characteristics can be simultaneously achieved. In addition, because a reduction can be made in the asymmetry of a displacement distribution in the longitudinal direction, a reduction can be made in discharge bending. Thus, from this viewpoint, an improvement can be made in discharge characteristics.

The following: $A \geq B$ causes a larger tensile stress to the piezoelectric member. Thus, no favorable reliability is acquired, and no increase can be made in the amount of a discharge droplet. In a case where two sides of which the distance L is smallest are present like the present example, the following: $A \geq B1$ or $A \geq B2$ leads to no acquisition of a favorable result. Thus, B1 and B2 are required to satisfy the following relationship: $A<B$.

In the present embodiment, for example, the lower limit of A is preferably, but is not particularly limited to, 1 μm or more in consideration of misalignment at the time of patterning of each layer.

In this case, prevented can be a deterioration in reliability due to stress to the piezoelectric member, which is a brittle material, due to overlap between the piezoelectric member and the individual chamber.

In the present embodiment, for example, the upper limit of B is preferably, but is not particularly limited to, 20 μm or less. In this case, prevented can be a deterioration in pressure generation force due to a reduction in the area of the piezoelectric member.

In a case where a plurality of sides of which the distance L is smallest is present, the respective values of Bs are preferably the same or substantially the same. In the above example, the respective values of B1 and B2 are preferably the same or substantially the same. This case enables symmetry of the displacement distribution of the diaphragm in the lateral direction, so that variations can be suppressed in stress in the lateral direction to the piezoelectric member. Thus, a further improvement can be made in reliability.

Note that, in a case where a plurality of sides of which the distance L is largest is present, the respective values of As are preferably the same or substantially the same. For example, in a case where A1 and A2 are given, the respective values of A1 and A2 are preferably the same or substantially the same. This case enables suppression of variations in pressure to the piezoelectric member, so that a further improvement can be made in reliability.

In the present embodiment, in plan view (e.g., FIGS. 3A and 3B), the individual chamber 15 and the piezoelectric member 20 each have corner portions preferably curved in shape. The corner portion is also referred to as a "curved corner". Such curved corner portions of each of the individual chamber 15 and the piezoelectric member 20 enable stress dispersion, leading to an improvement in reliability. Note that a corner portion corresponds to a portion connecting two sides.

The mean value of distance between the end portion of the piezoelectric member 20 and the end portion of the individual chamber 15 at the portion curved in shape based on one of the corner portions of the individual chamber 15 is defined as C.

In a case where a corner portion connecting the side having A and the side having B is present, preferably, the corner portion satisfies the following:

$A<C<B$. Thus, stress load can be softened at the corner portion of the piezoelectric member, so that an improvement can be made in reliability at the time of long term driving.

In the present example, as illustrated in FIG. 3A, the side having A corresponds to the side 15-1 (second side), and the side having B corresponds to the sides 15-3 and 15-4 (third side). The side 15-1 is also referred to as a "second side", the side 15-2 is also referred to as a "first side", and the sides 15-3 and 15-4 are referred to as a "third side".

Thus, preferably, both the corner portion connecting the sides 15-1 and 15-3 and the corner portion connecting the sides 15-1 and 15-4 satisfy the following: $A<C<B$.

Satisfaction of the following: $A<C<B$ will be supplementarily described. Regarding a corner portion connecting the side having A and the side having B, A and B are required to satisfy the following: $A<C<B$. In other words, for example, regarding a corner portion different from the corner portion, A and B based on the two sides of the different corner portion do not necessarily satisfy the above expression. This will be described with FIG. 4. C based on the corner portion connecting the sides 15-1 and 15-3 is defined as C11. The following: $A<C11<B1$ enables acquisition of the above expected effect. At this time, further preferably, the following is satisfied: $A<C11<B2$. However, even in a case where the following is not satisfied: $A<C11<B2$, the above effect is acquired. Similarly, regarding the corner portion connecting the sides 15-1 and 15-4, the following: $A<C12<B2$ enables acquisition of the above expected effect. Further preferably, the following is satisfied: $A<C12<B1$.

Note that, as described below; in a case where no corner portion connecting the side having A and the side having B is present, preferably, the corner portions of the individual chamber 15, excluding any corner portion having the side having the base point bp as one side, all satisfy the following: A<C<B.

C described above will be described with FIG. 7.

Figure 7:
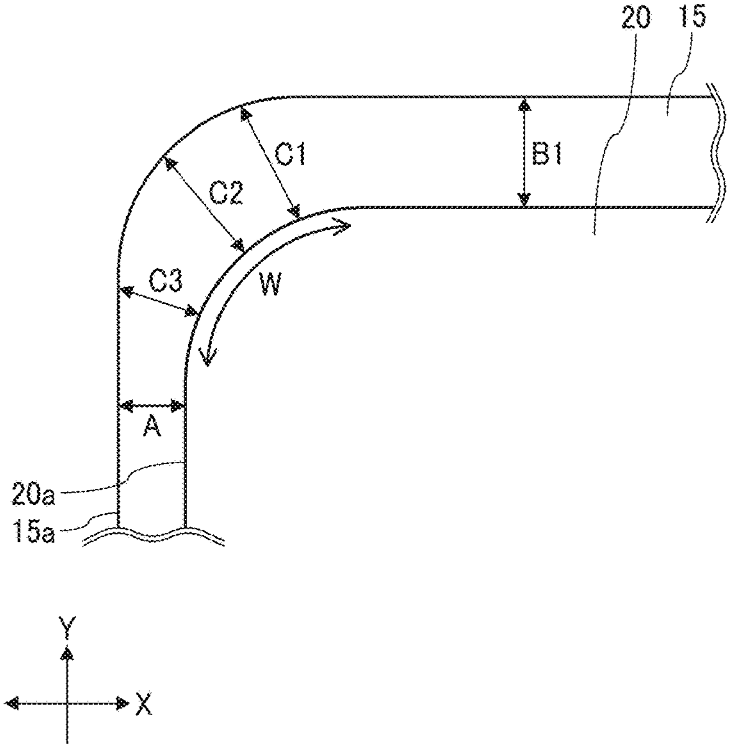
FIG. 7 is an enlarged view of a part surrounded by a broken line "b" in FIG. 3A.

FIG. 7 is an enlarged view of a part surrounded by a broken line b in FIG. 3A, namely, an enlarged schematic view of one corner portion. As illustrated in FIG. 7, an end portion 20*a* of the piezoelectric member 20 is denoted with reference sign "20*a*". An end portion 15*a* of the individual chamber 15 is denoted with reference sign "15*a*". The portion curved in shape based on the corner portion is denoted with reference sign W.

In the present embodiment, since the following is satisfied: A<B, the distance between the end portion of the piezoelectric member 20 and the end portion of the individual chamber 15 at the portion curved in shape is expected to vary depending on places. Referring to FIG. 7, changes in the distance between the end portion of the piezoelectric member 20 and the end portion of the individual chamber 15 at the portion curved in shape are indicated with C1, C2, and C3. In this example, the distance reduces from B1 toward A, namely, in the order of C1, C2, and C3. In the present example, for example, C1, C2, and C3 are averaged to find a mean value. Then, the mean value is defined as C (particularly, C11) and is compared with A, B1, or B2. Note that the number of measurement places for finding a mean value of distance between the end portion of the piezoelectric member 20 and the end portion of the individual chamber 15 can be appropriately changed.

As above, in a case where the distance between the end portion of the piezoelectric member 20 and the end portion of the individual chamber 15 at the portion curved in shape varies depending on places, preferably, a mean value is found and then is compared with A, B1, or B2.

In the present embodiment, the individual chamber 15 has a connection with a channel in communication with the common chamber 18. For disposition of the connection, a favorable place is present. That is, preferably, a connection 15*b* is formed at the central portion of one of the sides opposite the side having the base point bp in the individual chamber 15 or at the corner portion connecting two sides opposite the side having the base point bp in the individual chamber 15. In this case, applied stress to the diaphragm 13 can be dispersed at any side opposite the side having the base point bp in the individual chamber 15, so that damage can be inhibited from occurring.

This will be described with FIG. 8.

Figure 8:
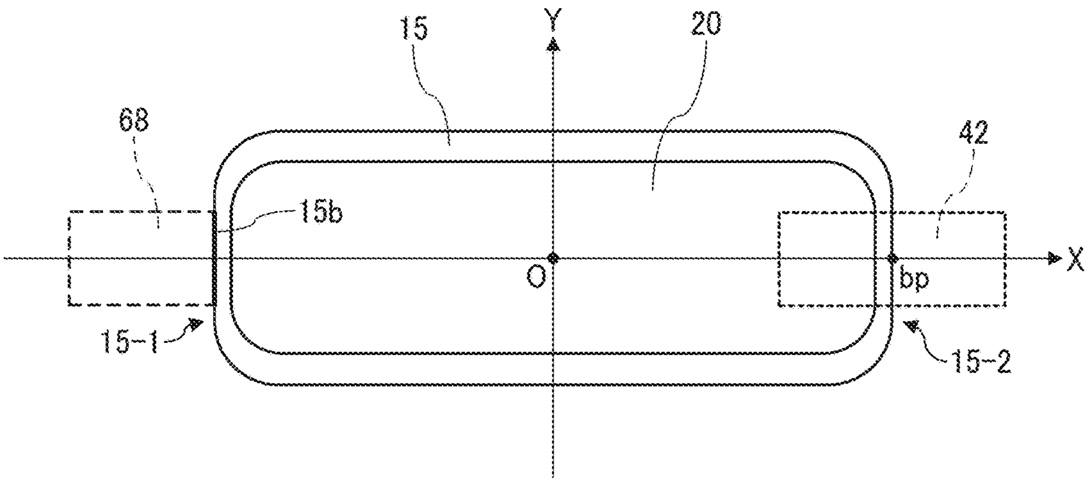
FIG. 8 is a schematic plan view of an example of a connection.

FIG. 8 is a schematic plan view similar to the schematic plan view of FIG. 3A. In the figure, the wiring 42 is formed on the side of location of one of the two shorter sides of the individual chamber 15 (side of location of the side 15-2), and the side 15-2 has the base point bp. In the present example, the central portion of the side 15-1 opposite the side 15-2 having the base point bp in the individual chamber 15 has the connection 15*b* with a channel 68 in communication with the common chamber 18. The connection 15*b* is formed, for example, by providing an opening to the partition of the individual chamber 15.

Note that, in the present example, the channel 68 corresponds to the position of the fluid resistant portion 17. At the central portion, the distance between the upper end portion of the connection 15*b* in the Y-axis direction and the X axis passing through the center O of the individual chamber 15 and the distance between the lower end portion of the connection 15*b* in the Y-axis direction and the X axis are equal.

Favorable places for formation of the connection 15*b* are as follows.

The individual chamber 15 is defined as being N-gonal in shape (N is an integer of 4 or more) in plan view. In a case where N is even, preferably, the central portion of the side opposite the side having the base point bp in the individual chamber 15 has the connection with the channel 68 in communication with the common chamber 18.

In a case where N is odd, preferably, the corner portion connecting two sides of the sides opposite the side having the base point bp in the individual chamber 15 has the connection with the channel 68 in communication with the common chamber 18.

In a case where the individual chamber 15 is rectangular in shape in plan view like the present example, the number of sides opposite the side having the base point bp is one. In a case where the individual chamber 15 is polygonal in shape, the number of sides opposite the side having the base point bp is not necessarily one. Thus, the expression "one of the sides opposite" is used.

[Exemplary Production of Liquid Discharge Head]

Next, exemplary production of the liquid discharge head according to the present embodiment will be described.

(a) The diaphragm 13 is formed on a silicon single crystal substrate with the plane orientation (110) (e.g., a thickness of 400 μm) as the actuator substrate 100.

For example, preferably, the diaphragm 13 has a structure in which three layers of a silicon dioxide film, a silicon nitride film, and an amorphous layer are stacked. In this case, the silicon dioxide film corresponds to compressive stress, and the silicon nitride film corresponds to tensile stress.

As a method for producing the diaphragm 13, for example, a low pressure chemical vapor deposition (LP-CVD) method can be used.

The thickness of the diaphragm 13 can be appropriately selected to obtain a desired value of stress.

As the amorphous layer, preferably, for example, a silicon dioxide film or alumina is used. In these cases, Pb included in an upper formed film of PZT is easily trapped. From the viewpoint of reliable prevention of Pb dispersion, the thickness of the amorphous layer is preferably 40 nm or more.

Next, for example, a film of $TiO_2$ having a thickness of 20 nm and a film of Pt having a thickness of 160 nm are formed by sputtering as the lower electrode 10 on the diaphragm 13.

(b) Next, a film of PZT having a thickness of 2 μm is formed as the piezoelectric member 20 on the lower electrode 10, for example, by a plurality of times of spin coating. Next, a film of SRO having a thickness of 40 nm and a film of Pt having a thickness of 100 nm are formed by sputtering as the upper electrode 11.

A method for forming the piezoelectric member 20 is not limited to a sol-gel method with spin coating and thus may be, for example, a sputtering method, an ion plating method, an aerosol method, or an inkjet method.

Herein, exemplary film formation with a sol-gel method will be given.

First, as a seed layer for controlling the orientation of PZT, a film of $PbTiO_3$ is formed by spin coating. Furthermore, a PZT precursor is formed by spin coating. At this time, the PZT precursor has a drying temperature of 120° C., a calcination temperature of 380° ° C., and a sintering temperature of 700° ° C. These temperatures can be appropriately changed.

Then, with a litho-etch method, the piezoelectric element 12 and the upper electrode 11 are formed positionally corresponding to the individual chamber 15 to be formed. The piezoelectric element 12 is formed positionally corresponding to a junction 48.

(c) Next, the inter-layer insulating film 45 is formed in order to insulate the lower electrode 10 and the piezoelectric member 20 against the lead wiring 42 to be formed.

As the inter-layer insulating film 45, for example, an $SiO_2$ film having a thickness of 1000 nm is formed with a plasma chemical vapor deposition (CVD) method. The inter-layer insulating film is not necessarily such an $SiO_2$ film and thus may be any film, having no influence on the piezoelectric element 12 and electrode materials and having insulation, with a plasma CVD method.

Next, a connection hole for connection of the upper electrode 11 and the lead wiring 42 is formed with a litho-etch method. For connection of the lower electrode 10 to the lead wiring 42, similarly, a connection hole is formed.

(d) Next, as the wiring 42, for example, a film of TiN having a thickness of 30 nm and a film of Al having a thickness of 3 μm are formed by sputtering. Pt, as a material of the upper electrode 11 or the lower electrode 10, connected directly with Al as a material of the lead wiring 42 at the bottom of the connection hole is alloyed due to heat history in a post-process. Thus, in order to prevent film detachment due to stress based on a change in volume, TiN serves as a barrier layer that prevents alloying.

The wiring 42 is also formed at a place for the junction 48 with the support substrate 200.

(e) Next, as a passivation film 50, for example, a silicon nitride film having a thickness of 1000 nm is formed with a plasma CVD method.

(f) Next, with a litho-etch method, openings are made for a lead wiring pad 41 of the lead wiring 42, an actuator, and the common liquid supply path 19.

(g) Next, with a litho-etch method, the diaphragm 13 at places for the common liquid supply path 19 and the common chamber 18 is removed.

(h) Next, with a litho-etch method, a spot facing 67 is provided positionally corresponding to the actuator, resulting in formation of a mainstream liquid chamber and a sub-stream liquid chamber. Then, the support substrate 200 is produced. At this time, for example, Si is subjected to dry etching.

Next, the support substrate 200 and the actuator substrate 100 are joined with the adhesive 49 through the junction 48. The adhesive having a thickness of approximately 1 μm is coated on the support substrate 200 by a typical thin-film transfer apparatus.

Next, for formation of the individual chamber 15, the common chamber 18, and the fluid resistant portion 17, the actuator substrate 100 is polished by a publicly known technique so as to have a desired thickness t (e.g., a thickness of 80 μm). The actuator substrate 100 may be etched instead of being polished.

(i) Next, a partition portion not corresponding to the individual chamber 15, the common chamber 18, and the fluid resistant portion 17 is covered with resist by lithography. Next, the individual chamber 15, the common chamber 18, and the fluid resistant portion 17 are formed by dry etching with an inductively coupled plasma (ICP) etcher. The lead wiring 42 for supplying a voltage to the upper electrode 11 is formed on the side of location of one of the end portions in the longitudinal direction (side of location of the side 15-2).

In the above, for example, as illustrated in FIG. 4, the individual chamber 15 and the piezoelectric member 20 are formed such that the followings are satisfied: A<B1 and A<B2. As an exemplary configuration in the present embodiment, preferably, the individual chamber 15 is formed so as to have four corner portions curved in shape and the piezoelectric member 20 is formed so as to have four corner portions curved in shape corresponding one-to-one to the corner portions of the individual chamber 15.

(j) Next, the nozzle substrate 300 is joined such that nozzles 16 positionally correspond one-to-one to individual chambers 15 formed separately. In this manner, the liquid discharge head 1 can be produced.

Example 2

Next, another example of the present embodiment will be described. The duplicate descriptions to the above embodiment will be omitted.

Figure 9A:
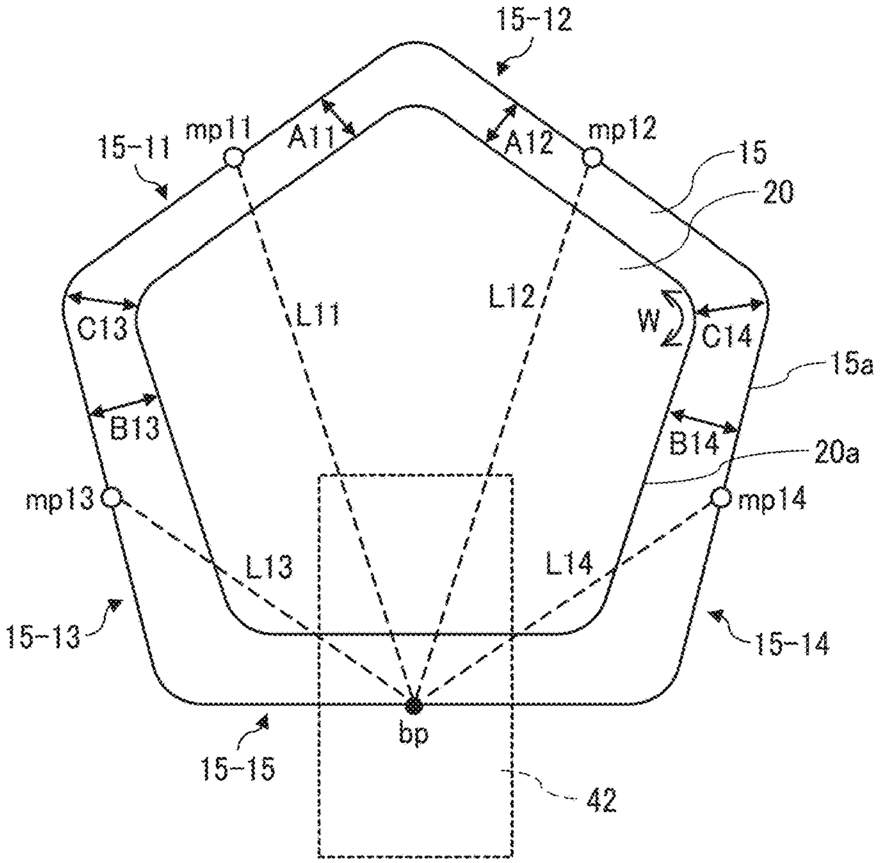
FIG. 9A is a schematic plan view of another example of the liquid discharge head according to the present embodiment.

In the above embodiment, the individual chamber 15 and the piezoelectric member 20 are each rectangular in shape in plan view; but the present embodiment is not limited to this. An individual chamber 15 and a piezoelectric member 20 are each polygonal with four sides or more in plan view:

FIG. 9A exemplifies the individual chamber 15 and the piezoelectric member 20 each pentagonal in plan view: As illustrated in FIG. 9A, the individual chamber 15 in the present example has sides 15-11 to 15-15 as five sides. The side 15-15 has a base point bp at its middle point, and the other sides have middle points mp11 to mp14. The respective distances (distances L) from the base point bp to the middle points of the other sides of the individual chamber 15 are denoted with L11 to L14.

In the present example, the side of which the distance L is largest corresponds to the sides 15-11 and 15-12, and the side of which the distance L is smallest corresponds to the sides 15-13 and 15-14. In the present example, the distance between the end portion of the individual chamber 15 and the end portion of the piezoelectric member 20 based on the side 15-11 is defined as A11, and the distance between the end portion of the individual chamber 15 and the end portion of the piezoelectric member 20 based on the side 15-12 is defined as A12. The distance between the end portion of the individual chamber 15 and the end portion of the piezoelectric member 20 based on the side 15-13 is defined as B13, and the distance between the end portion of the individual chamber 15 and the end portion of the piezoelectric member 20 based on the side 15-14 is defined as B14.

In the present example, regarding all corresponding sides, the relationship between A and B satisfies the following: A<B.

That is, the followings are all satisfied:

A11<B13,

A11<B14,

A12<B13, and

A12<B14. In this case, such an expected effect as described in the above embodiment is acquired.

In the present example, the number of sides of which the distance L is largest may be one or the number of sides of which the distance L is smallest may be one. For example, in a case where the following is satisfied: L11>L12, the side of which the distance L is largest corresponds to only the side 15-1. In a case where the following is satisfied: L13>L14, the side of which the distance L is smallest corresponds to only the side 15-4. In a case where the followings are satisfied: L11>L12 and L13>L14, the following is required to be satisfied: A11<B14. Conversely, in a case where the followings are satisfied: L11<L12 and L13<L14, the following is required to be satisfied: A12<B13. Note that, in a case where the shape of the individual chamber 15 is a regular pentagon, a plurality of As and a plurality of Bs are present.

Similarly to the above example, in the present example, preferably, the individual chamber 15 and the piezoelectric member 20 each have corner portions curved in shape. In the present example, preferably; the mean value of distance C between the end portion of the piezoelectric member 20 and the end portion of the individual chamber 15 at the portion curved in shape satisfies the following: A<C<B.

In the present example, a corner portion connecting the side having A and the side having B is present. In this case, preferably, the corner portion satisfies the following: A<C<B. That is, preferably, the mean value of distance C13 between the end portion of the piezoelectric member 20 and the end portion of the individual chamber 15 at the portion curved in shape based on the corner portion connecting the side 15-11 having A11 and the side 15-13 having B13 satisfies the following: A11<C13<B13.

Preferably, the mean value of distance C14 between the end portion of the piezoelectric member 20 and the end portion of the individual chamber 15 at the portion curved in shape based on the corner portion connecting the side 15-12 having A12 and the side 15-14 having B14 satisfies the following: A12<C14<B14.

Figure 9B:
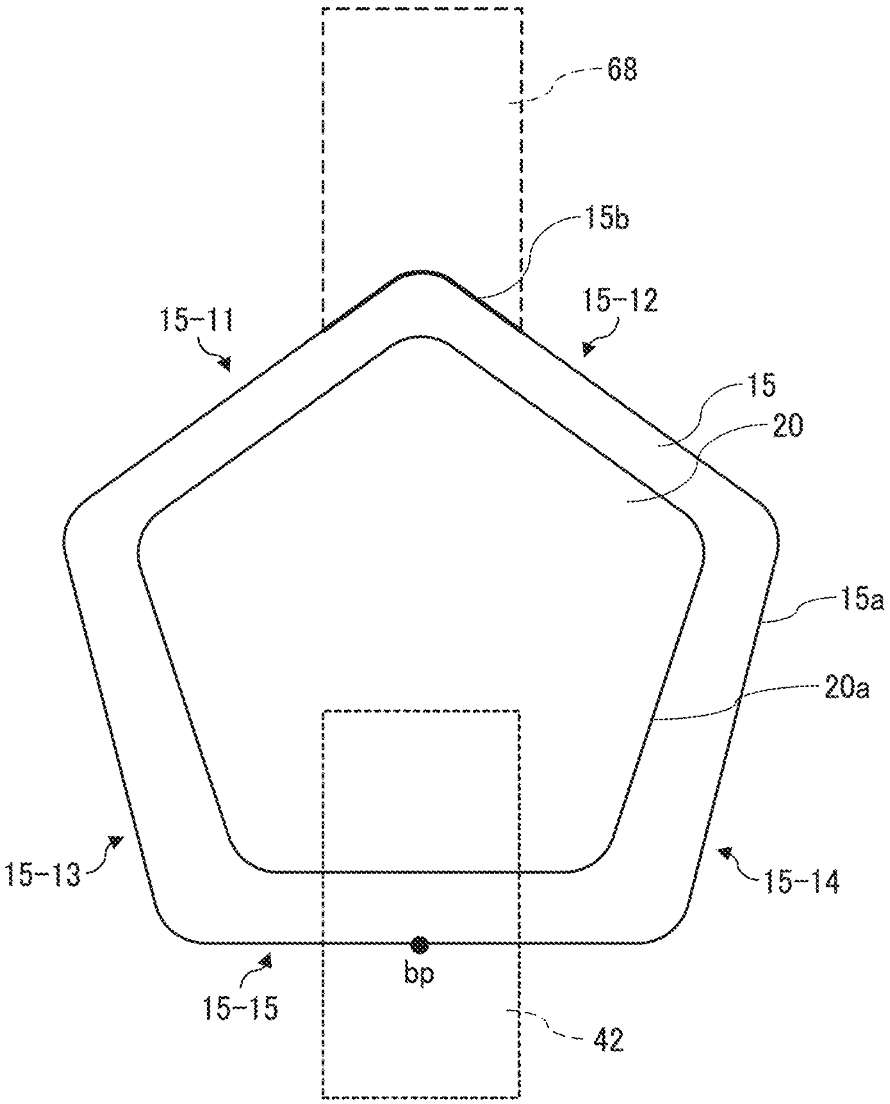
FIG. 9B is a schematic plan view of another example of the connection.

Satisfaction of the following: A11<C13<B13 regarding the corner portion connecting the side 15-11 having A11 and the side 15-13 having B13 enables acquisition of the above expected effect. Further preferably, the following is satisfied: A11<C13<B14 or A12<C13<B13. However, the expressions are not necessarily satisfied in configuration. In the present example, in a case where a connection 15*b* with a channel 68 in communication with a common chamber 18 is formed at the individual chamber 15, preferably, the connection 15*b* is formed at the corner portion connecting two sides (sides 15-11 and 15-12) of the sides opposite the side 15-15 having the base point bp in the individual chamber 15. FIG. 9B is a schematic plan view for describing an exemplary case where the connection 15*b* is formed in the present example. As illustrated in FIG. 9B, the connection 15*b* is formed at the corner portion connecting two sides (corner portion connecting the sides 15-11 and 15-12) of the sides opposite the side 15-15 having the base point bp in the individual chamber 15.

Example 3

Next, still another example of the present embodiment will be described.

Figure 10A:
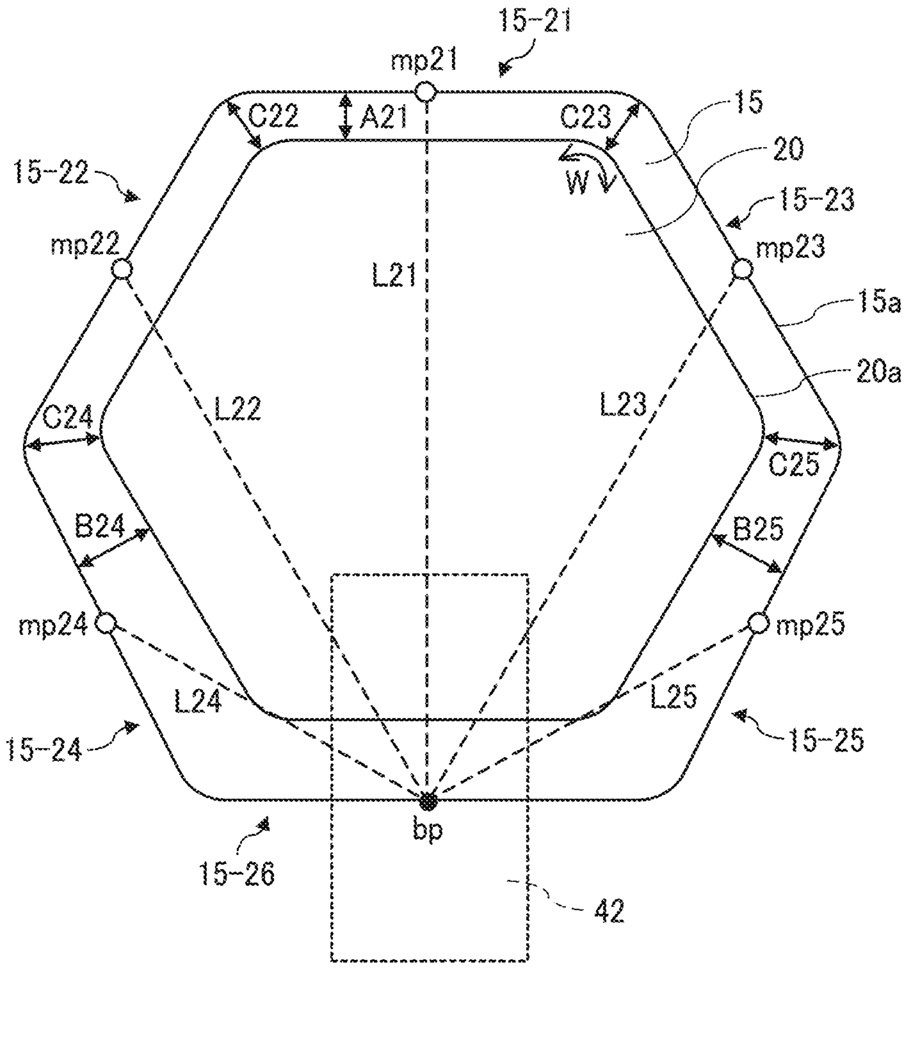
FIG. 10A is a schematic plan view of still another example of the liquid discharge head according to the present embodiment.

FIG. 10A exemplifies an individual chamber 15 and a piezoelectric member 20 each hexagonal in plan view: As illustrated in FIG. 10A, the individual chamber 15 in the present example has sides 15-21 to 15-26 as six sides. The side 15-26 has a base point bp at its middle point, and the other sides have middle points mp21 to mp25. The respective distances (distances L) from the base point bp to the middle points of the other sides of the individual chamber 15 are denoted with L21 to L25.

In the present example, the side of which the distance L is largest corresponds to the side 15-21, and the side of which the distance L is smallest corresponds to the sides 15-24 and 15-25. In the present example, the distance between the end portion of the individual chamber 15 and the end portion of the piezoelectric member 20 based on the side 15-21 is defined as A21. The distance between the end portion of the individual chamber 15 and the end portion of the piezoelectric member 20 based on the side 15-24 is defined as B24. The distance between the end portion of the individual chamber 15 and the end portion of the piezoelectric member 20 based on the side 15-25 is defined as B25.

In the present example, regarding all corresponding sides, the relationship between A and B satisfies the following: A<B.

That is, the followings are all satisfied:

A21<B24, and

A21<B25. In this case, such an expected effect as described in the above embodiment is acquired.

In the present example, the number of sides of which the distance L is largest may be one or the number of sides of which the distance L is smallest may be one.

Similarly to the above embodiment, in the present example, preferably, the individual chamber 15 and the piezoelectric member 20 each have corner portions curved in shape. In the present example, preferably, the mean value of distance C between the end portion of the piezoelectric member 20 and the end portion of the individual chamber 15 at the portion curved in shape satisfies the following: A<C<B.

In the present example, no corner portion connecting the side having A and the side having B is present. In this case, preferably, the corner portions of the individual chamber 15, excluding any corner portion having the side 15-26 having the base point bp as one side, all satisfy the following: A<C<B.

Note that the corner portion having the side 15-26 having the base point bp as one side corresponds to the corner portion connecting the sides 15-24 and 15-26 (lower left in FIG. 10A) and the corner portion connecting the sides 15-25 and 15-26 (lower right in FIG. 10A). Preferably, the four corner portions without the two corner portions all satisfy the following: A<C<B.

For example, preferably, the followings are all satisfied: A21<C22<B24 . . . (1), A21<C24<B24 . . . (2), A21<C23<B25 . . . (3), and A21<C25<B25 . . . (4).

Note that satisfaction of the following: A<C<B regarding all the corresponding corner portions is not limited to satisfaction of all the above expressions (1) to (4).

For example, preferably, the followings are all satisfied: A21<C22<B25 . . . (5), A21<C24<B25 . . . (6), A21<C23<B24 . . . (7), and A21<C25<B24 . . . (8).

If the relationship: A<C<B is satisfied regarding all the corresponding corner portions, an expected effect can be acquired.

In a case where a connection 15*b* with a channel 68 in communication with a common chamber 18 is formed at the individual chamber 15, preferably, the formation of the connection 15*b* is similar to the formation of the connection 15*b* in FIG. 8. That is, preferably, the connection 15*b* is formed at the central portion of the side 15-21 opposite the side 15-26 having the base point bp in the individual chamber 15.

Figure 10B:
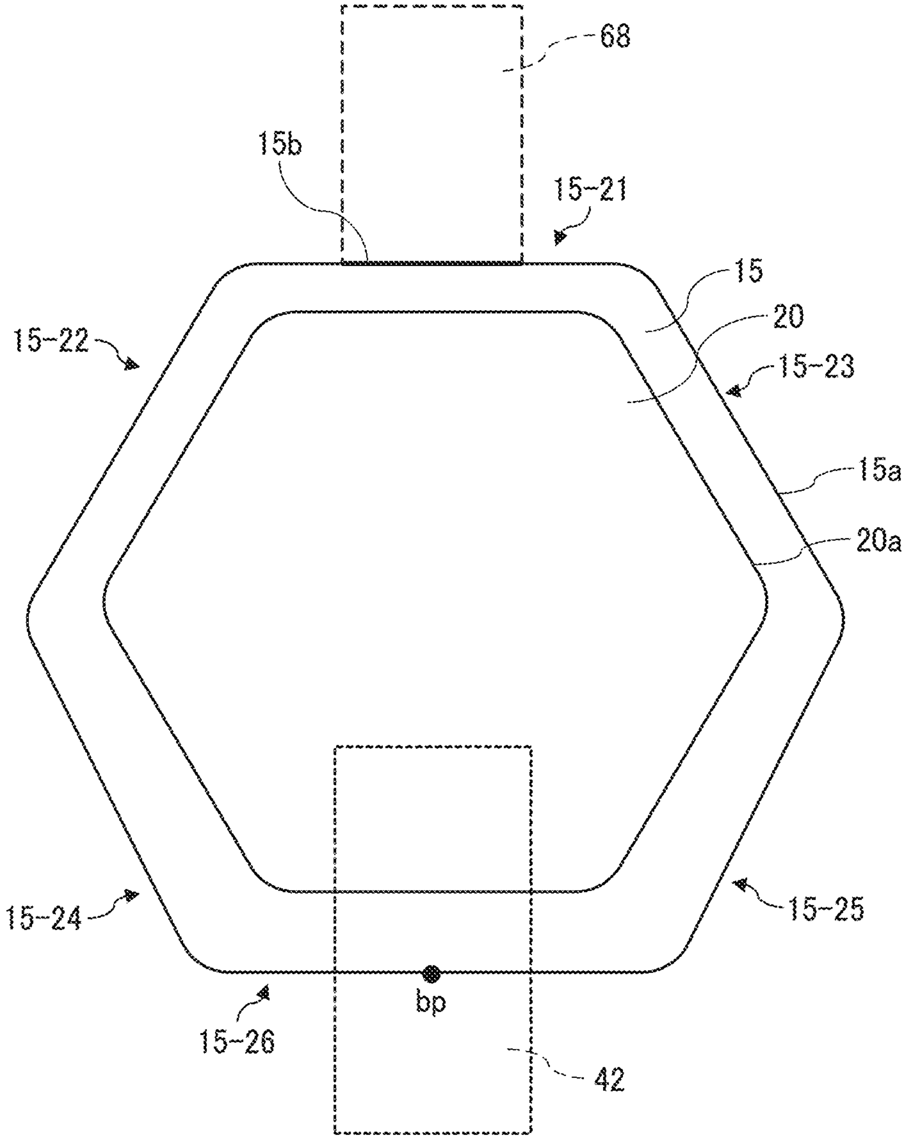
FIG. 10B is a schematic plan view of still another example of the connection.

FIG. 10B is a schematic plan view for describing an exemplary case where the connection 15*b* is formed in the present example. As illustrated in FIG. 10B, the connection 15*b* is formed at the side 15-21 opposite the side 15-26 having the base point bp in the individual chamber 15.

[Liquid Discharge Apparatus and Liquid Discharge Device]

Next, an inkjet recording apparatus will be described as an example of the liquid discharge apparatus according to the present embodiment.

Figure 11:
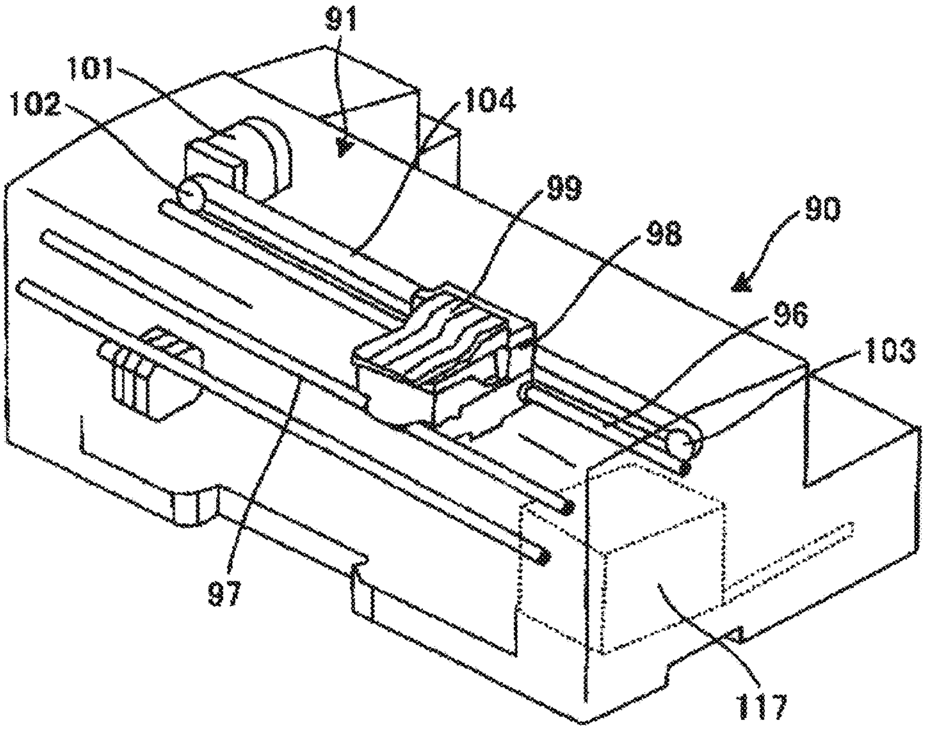
FIG. 11 is a schematic perspective view of an example of a liquid discharge apparatus according to the present embodiment.
Figure 12:
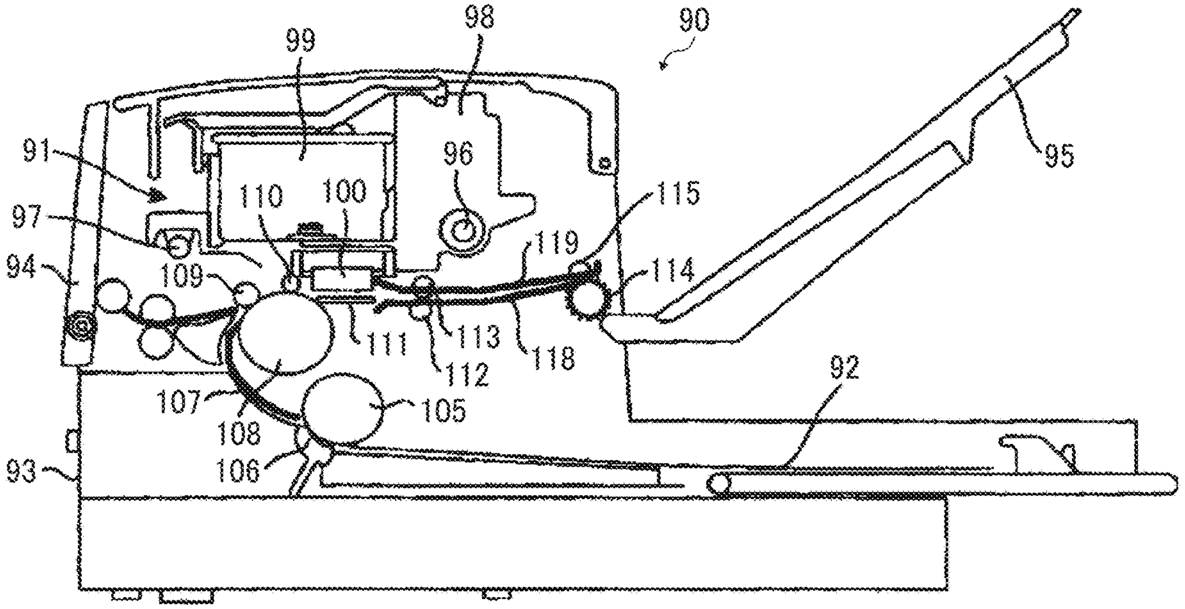
FIG. 12 is a schematic side view of the example of the liquid discharge apparatus according to the present embodiment.

FIGS. 11 and 12 illustrate an inkjet recording apparatus 90 in the present example.

The inkjet recording apparatus 90 includes, for example, a carriage 98, a liquid discharge head 1, and a print mechanism 91. The carriage 98 is movable in the scanning direction inside an apparatus body. As the liquid discharge head 1, the liquid discharge head according to the present embodiment can be used. For example, the liquid discharge head 1 is mounted on the carriage 98. The print mechanism 91 includes, for example, an ink cartridge 99 that supplies ink to the liquid discharge head 1.

The apparatus body has a lower portion to which a sheet feeding cassette 93 (or a sheet feeding tray), on which a plurality of sheets 92 can be loaded, is detachably attached from the front side. Provided may be a manual sheet feeding tray 94 openable for manual feeding of a sheet 92. After import of a sheet 92 fed from the sheet feeding cassette 93 or the manual sheet feeding tray 94, the print mechanism 91 records a required image on the sheet 92. After that, the sheet 92 is ejected to a sheet ejection tray 95 attached to the back face side.

The print mechanism 91 includes a primary guide rod 96 and a secondary guide rod 97 as guide members laterally bridged between a left side plate and a right side plate, and retains the carriage 98 slidably in the main scanning direction. The liquid discharge head 1 that discharges ink droplets of respective colors of yellow (Y), cyan (C), magenta (M), and black (Bk) is attached to the carriage 98 such that a plurality of ink discharge ports (nozzles) is arrayed in a direction intersecting the main scanning direction with a downward direction of discharging of ink droplets. Ink cartridges 99 each for supplying ink for the corresponding color to the liquid discharge head 1 are exchangeably attached to the carriage 98.

The ink cartridges 99 each have an upper portion provided with an air vent in communication with the air and a lower portion provided with a supply port for supplying ink to the liquid discharge head 1. The ink cartridges 99 each have a porous member filled with ink, inside. Due to the capillary force of the porous member, the ink to be supplied to the liquid discharge head 1 is kept at a slight negative pressure.

As the liquid discharge head 1, provided are liquid discharge heads 1 for the colors. However, provided may be a single liquid discharge head having nozzles for discharging ink droplets of the colors.

The carriage 98 has a rear portion (on the downstream side of sheet conveyance) slidably fit to the primary guide rod 96 and a front portion (on the upstream side of sheet conveyance) slidably placed on the secondary guide rod 97. In order to move the carriage 98 for scanning in the main scanning direction, a timing belt 104 is stretched between a drive pulley 102 that a main scanning motor 101 drives to rotate and a driven pulley 103.

The timing belt 104 is secured to the carriage 98. Thus, the carriage 98 reciprocates due to forward and reverse rotations of the main scanning motor 101.

For conveyance of a sheet 92 set in the sheet feeding cassette 93 to the lower side of the liquid discharge head 1, the apparatus in the present example includes a sheet feeding roller 105, a friction pad 106, a guide member 107, a conveying roller 108, and a leading rolling member 110.

The sheet feeding roller 105 and the friction pad 106 separates and feeds a sheet 92 from the sheet feeding cassette 93. The guide member 107 guides the sheet 92. The conveying roller 108 inverts and conveys the fed sheet 92. The leading rolling member 110 regulates the angle of delivery of the sheet 92 from a conveying rolling member 109 thrust against the circumferential face of the conveying roller 108 and the conveying roller 108. The conveying roller 108 is driven to rotate by a sub-scanning motor through a gear train.

The apparatus in the present example includes a sheet guide member 111. The sheet guide member 111 guides, on the lower side of the liquid discharge head 1, the sheet 92 delivered from the conveying roller 108 in accordance with the range of movement of the carriage 98 in the main scanning direction.

On the downstream side in the direction of sheet conveyance of the sheet guide member 111, provided are a conveying rolling member 112 and a spur gear 113 to be driven to rotate to deliver the sheet 92 in the direction of sheet ejection. Furthermore, disposed are a sheet ejection roller 114 and a spur gear 115 that deliver the sheet 92 to the sheet ejection tray 95, and guide members 118 and 119 forming a sheet ejection path.

For recording, while moving the carriage 98, the inkjet recording apparatus 90 drives the liquid discharge head 1 in accordance with an image signal. For example, ink is discharged to the sheet 92 remaining stopped to perform recording for one line. Then, after a predetermined amount of conveyance of the sheet 92, recording is performed for the next line. In response to reception of a recording termination signal or a signal indicating that the rear end of the sheet 92 has reached the recording region, the recording operation terminates, leading to ejection of the sheet 92.

A recovery device 117 that recovers the liquid discharge head 1 from discharge trouble is disposed out of the recording region on the right end side in the direction of movement of the carriage 98. The recovery device 117 includes a cap, a sucker, and a cleaner. The carriage 98 moves to the side of location of the recovery device 117 in order to stand for printing. Then, the liquid discharge head 1 is capped with the cap to keep a discharge port portion in a moist state, leading to prevention of discharge trouble due to ink drying.

For example, in the middle of recording, ink discharge not relating to the recording causes the viscosity of ink at all the discharge ports to be constant, leading to maintenance of a stable discharge state.

For example, in a case where discharge trouble occurs, the cap seals hermetically the discharge ports (nozzles) of the liquid discharge head 1. Then, the sucker sucks out, for example, air bubbles together with ink from the discharge ports through a tube. Thus, the cleaner removes, for example, ink or dust having adhered to a discharge port face, resulting in recovery from the discharge trouble. The sucked ink is discharged to a waste ink container provided at the lower portion of the body and then is absorbed and retained by an ink absorber inside the waste ink container.

The inkjet recording apparatus 90 including the liquid discharge head 1 according to the present embodiment enables a stable ink discharge characteristics, leading to an improvement in image quality: The inkjet recording apparatus 90 including the liquid discharge head 1 has been described above. However, the liquid discharge head 1 may be applied to an apparatus that discharges non-ink liquid droplets, such as liquid resist for patterning.

Next, another embodiment of the liquid discharge apparatus according to the present embodiment will be described. A recording apparatus will be described below as an example of the liquid discharge apparatus according to the present embodiment.

The liquid discharge head according to the present embodiment can be used in various types of recording apparatuses of an inkjet recording system, such as a printer, a facsimile apparatus, a copying machine, a printer/facsimile/multifunction peripheral, a solid shaping apparatus, and a bioprinter.

In the present embodiment, a recording apparatus corresponds to an apparatus capable of discharging ink or various types of treatment liquids to a recording medium, and a recording method corresponds to a method for recording with the apparatus. Such a recording medium denotes an object to which ink or various types of treatment liquids can adhere temporarily.

The recording apparatus can include not only a head that discharges ink but also a feeder, a conveyer, and an ejector for recording media, and devices, such as a preprocessing device and postprocessing device.

For the recording apparatus and the recording method, provided may be a heater for use in a heat process and a dryer for use in a dry process. For example, the heater heats the printed face or back face of a recording medium. The dryer dries the printed face or back face of a recording medium. Examples of the heater and the dryer that can be used include, but are not particularly limited to, a warm air heater and an infrared heater. Heating and drying can be performed, for example, before printing, during printing, or after printing.

The recording apparatus and the recording method are not limited to visualization of a significant image, such as a character or a figure, with ink. For example, the recording apparatus and the recording method may be intended for formation of a pattern, such as a geometric pattern, or shaping of a three-dimensional image. Examples of the recording apparatus include, but are not particularly limited to, a serial type apparatus that moves a liquid discharge head and a line type apparatus that does not move a liquid discharge head. Examples of the recording apparatus further include a desktop recording apparatus, a wide recording apparatus capable of printing to an A0-size recording medium, and a continuous stationery printer for rolled continuous paper as a recording medium.

Next, another example of the liquid discharge apparatus according to the present embodiment will be described with reference to FIGS. 13 and 14.

Figure 13:
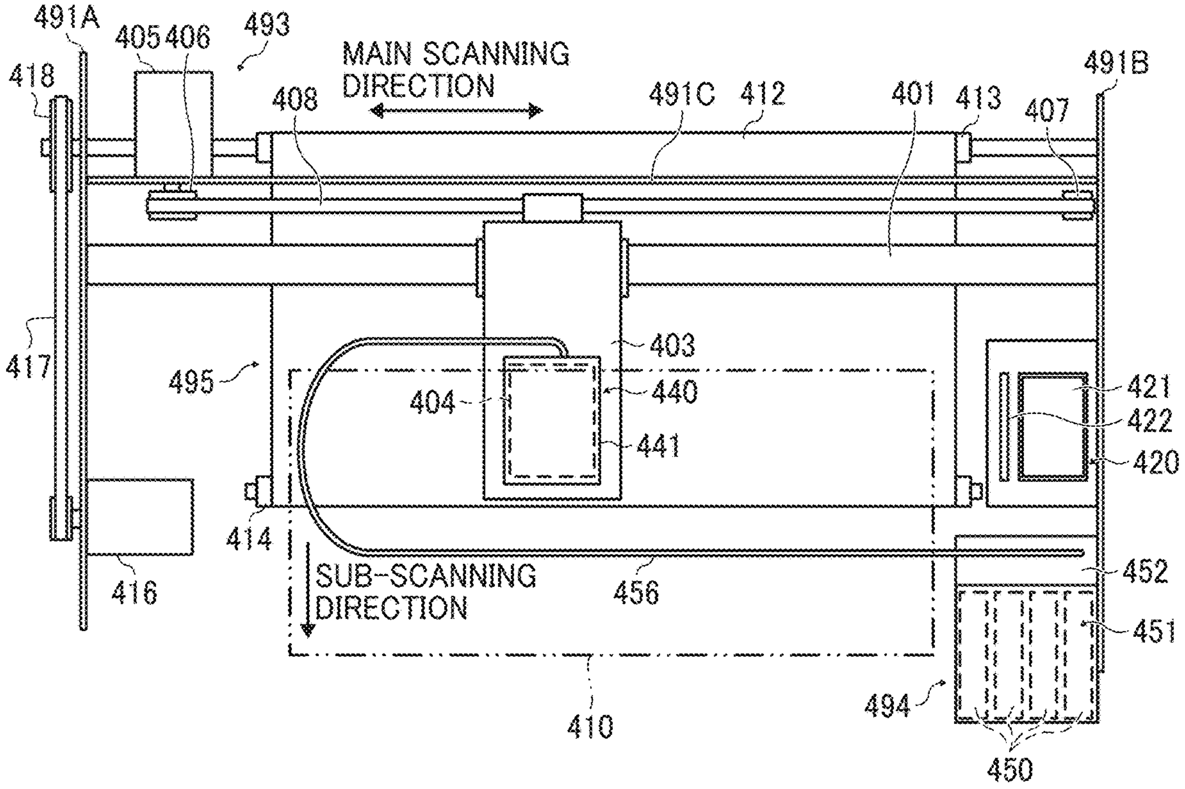
FIG. 13 is a schematic view of another example of the liquid discharge apparatus according to the present embodiment.

FIG. 13 is an explanatory plan view of a main part of the apparatus.

Figure 14:
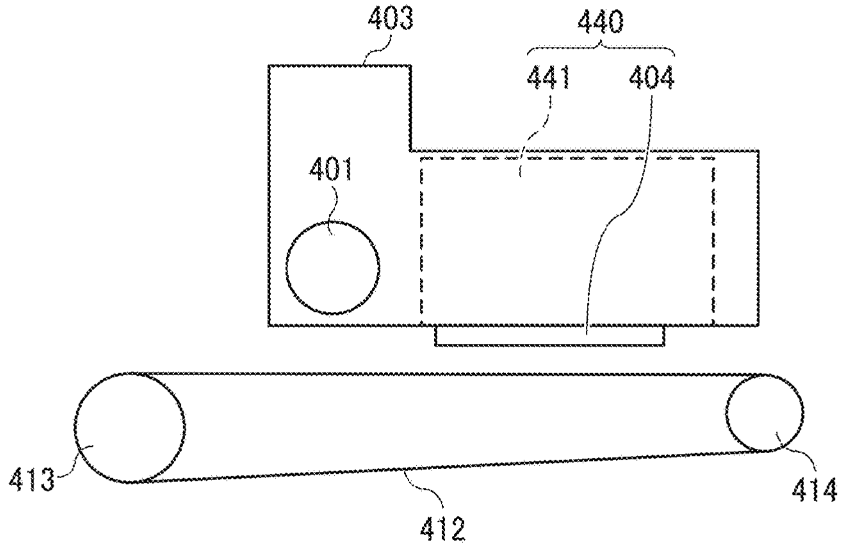
FIG. 14 is a schematic view of the another example of the liquid discharge apparatus according to the present embodiment.

FIG. 14 is an explanatory side view of the main part of the apparatus.

The apparatus serves as a serial type apparatus. Due to a main scanning movement mechanism 493, a carriage 403 reciprocates in the main scanning direction. The main scanning movement mechanism 493 includes a guide member 401, a main scanning motor 405, and a timing belt 408. The guide member 401 is bridged between a left side plate 491A and a right side plate 491B and retains the carriage 403 movably. Then, due to the main scanning motor 405, the carriage 403 reciprocates in the main scanning direction through the timing belt 408 bridged between a drive pulley 406 and a driven pulley 407.

The carriage 403 is equipped with a liquid discharge device 440 including a liquid discharge head 404 according to the present embodiment and a head tank 441, integrally. The liquid discharge head 404 of the liquid discharge device 440 discharges liquids of colors, such as yellow (Y), cyan (C), magenta (M), and black (K). The liquid discharge head 404 is attached such that a nozzle array of a plurality of nozzles 16 is disposed in the sub-scanning direction orthogonal to the main scanning direction with a downward direction of discharging.

A supply mechanism 494 that supplies the liquid discharge head 404 with liquid stored outside the liquid discharge head 404 supplies the head tank 441 with liquid stored in a liquid cartridge 450.

The supply mechanism 494 includes a cartridge holder 451 as a holder to which the liquid cartridge 450 is attached, a tube 456, and a liquid feeding unit 452 including a liquid feeding pump. The liquid cartridge 450 is detachably attached to the cartridge holder 451. The liquid feeding unit 452 feeds the liquid from the liquid cartridge 450 to the head tank 441 through the tube 456.

The apparatus includes a conveyance mechanism 495 that conveys a sheet 410. The conveyance mechanism 495 includes a conveying belt 412 as a conveyor and a sub-scanning motor 416 that drives the conveying belt 412.

The conveying belt 412 attracts and conveys the sheet 410 such that the sheet 410 faces the liquid discharge head 404. The conveying belt 412 serves as an endless belt stretched between a conveying roller 413 and a tension roller 414. Such attraction as above can be achieved by electrostatic attraction or air suction.

Then, through a timing belt 417 and a timing pulley 418, the sub-scanning motor 416 drives the conveying roller 413 to rotate, so that the conveying belt 412 runs circumferentially in the sub-scanning direction.

Furthermore, on the lateral side of the conveying belt 412 on one side in the main scanning direction of the carriage 403, disposed is a maintenance mechanism 420 that maintains the liquid discharge head 404.

The maintenance mechanism 420 includes, for example, a cap member 421 that caps the nozzle face of the liquid discharge head 404 (face on which the nozzles 16 are formed) and a wiper member 422 that wipes the nozzle face.

The main scanning movement mechanism 493, the supply mechanism 494, the maintenance mechanism 420, and the conveyance mechanism 495 are attached to a housing including the left side plate 491A, the right side plate 491B, and a rear plate 491C.

In the apparatus having such a configuration as above, the sheet 410 is fed on and attracted to the conveying belt 412. Then, the sheet 410 is conveyed in the sub-scanning direction due to a circumferential run of the conveying belt 412.

Then, with the carriage 403 moving in the main scanning direction, the liquid discharge head 404 is driven, in accordance with an image signal, to discharge liquid to the sheet 410 remaining stopped, leading to formation of an image.

As above, the apparatus including the liquid discharge head according to the present embodiment enables stable formation of a high-quality image.

Next, another example of the liquid discharge device according to the present embodiment will be described with reference to FIG. 15.

Figure 15:
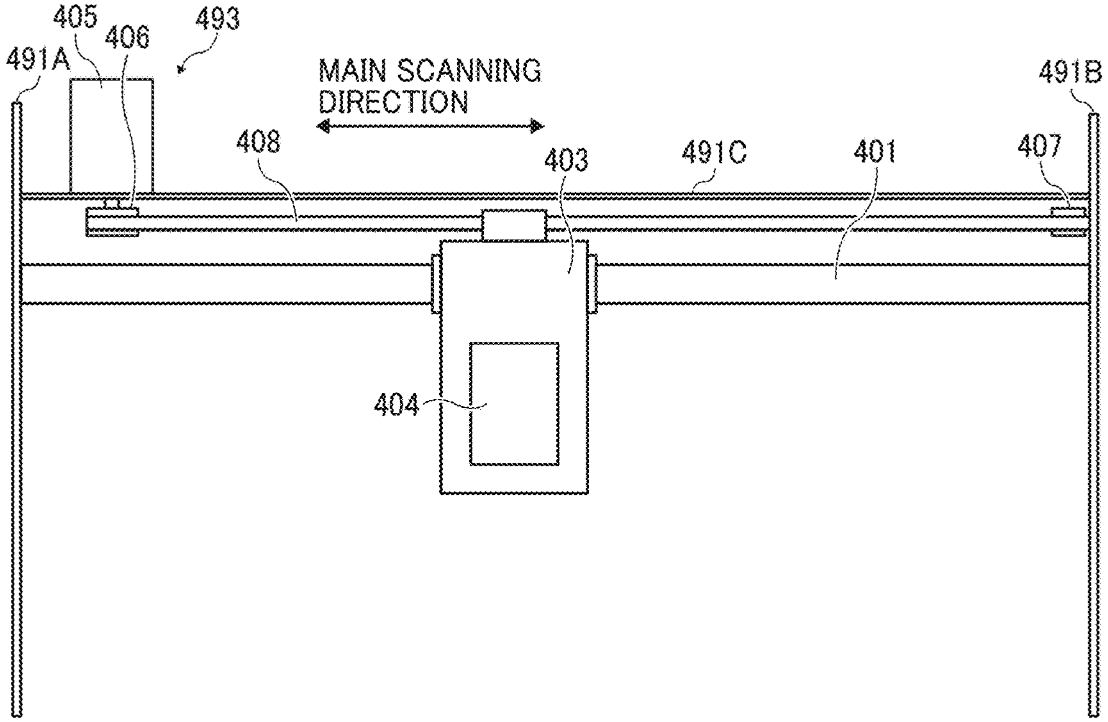
FIG. 15 is a schematic view of an example of a liquid discharge device.

FIG. 15 is an explanatory plan view of a main part of the liquid discharge device.

The liquid discharge device includes the housing including the left side plate 491A, the right side plate 491B, and the rear plate 491C, the main scanning movement mechanism 493, the carriage 403, and the liquid discharge head 404, from among the constituent members of the liquid discharge apparatus described above.

Note that, for example, the liquid discharge device may have the right side plate 491B to which at least either the maintenance mechanism 420 or supply mechanism 494 described above is attached.

Next, still another example of the liquid discharge device according to the present embodiment will be described with reference to FIG. 16.

Figure 16:
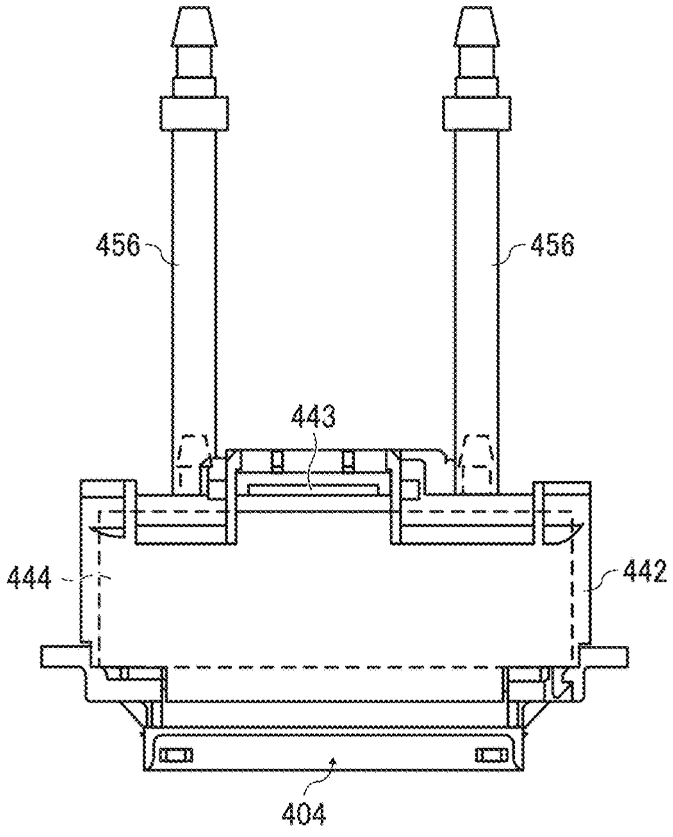
FIG. 16 is a schematic view of another example of the liquid discharge device.

FIG. 16 is an explanatory front view of the liquid discharge device.

The liquid discharge device includes a liquid discharge head 404 to which a channel component 444 is attached, and a tube 456 connected to the channel component 444.

Note that the channel component 444 is disposed inside a cover 442. Instead of the channel component 444, a head tank 441 can be provided. The channel component 444 has an upper portion provided with a connector 443 for electrical connection with the liquid discharge head 404.

In the present specification, the "liquid discharge apparatus" includes a liquid discharge head or a liquid discharge device and drives the liquid discharge head to discharge liquid. Examples of the liquid discharge apparatus include an apparatus capable of discharging liquid to an object to which liquid can adhere and an apparatus that discharges liquid into gas or liquid.

The "liquid discharge apparatus" can include a feeder, a conveyer, and an ejector for an object to which liquid can adhere, a preprocessing device, and a postprocessing device.

Examples of the "liquid discharge apparatus" include an image forming apparatus that discharges ink to a sheet to form an image on the sheet, and a solid shaping apparatus (three-dimensionally shaping apparatus) that discharges shaping liquid to a powder-conglomeration layer as a layered conglomeration of powder in order to shape a solid shaped object (three-dimensionally shaped object).

The "liquid discharge apparatus" is not limited to visualization of a significant image, such as a character or a figure, with discharged liquid. For example, the liquid discharge apparatus may be intended for formation of a meaningless pattern or shaping of a three-dimensional image.

The "object to which liquid can adhere" denotes an object to which liquid can adhere at least temporarily, an object on which liquid fastens after adhering to, and an object into which liquid permeates after adhering to. Specific examples of the "object to which liquid can adhere" include a recording medium, such as a sheet, recording paper, a recording sheet, a film, or cloth, an electronic component, such as an electronic circuit board or a piezoelectric element, and a medium, such as a powder-conglomeration layer (powder layer), an organ model, or a testing cell. Unless otherwise particularly limited, the "object to which liquid can adhere" may be any object to which liquid adheres.

Examples of the material of the "object to which liquid can adhere" include paper, thread, fiber, fabric, leather, metal, plastic, glass, wood, ceramic, building materials, such as wallpaper and flooring, and a textile for clothing that enable temporary adhesion of liquid.

Examples of the "liquid" include ink, treatment liquid, a deoxyribonucleic acid (DNA) sample, resist, pattern material, a binder, shaping liquid, and a solution or dispersion liquid containing an amino acid, protein, or calcium.

The "liquid discharge apparatus" may be, but is not limited to, an apparatus that moves relatively a liquid discharge head and an object to which liquid can adhere. Specific examples of the "liquid discharge apparatus" include a serial type apparatus that moves a liquid discharge head and a line type apparatus that does not move a liquid discharge head.

Examples of the "liquid discharge apparatus" further include a treatment-liquid coating apparatus that discharges, for the purpose of reforming the surface of a sheet, treatment liquid to the sheet to coat the treatment liquid on the surface of the sheet, and a jet granulation apparatus that jets a composition liquid including row material dispersed in a solution, through a nozzle to granulate fine particles of the row material.

The "liquid discharge device" corresponds to an integration of a liquid discharge head and a functional component or mechanism, namely, an assembly of components relating to liquid discharge. Examples of the "liquid discharge device" include a combination of a liquid discharge head with at least one of a head tank, a carriage, a supply mechanism, a maintenance mechanism, or a main scanning movement mechanism.

Examples of such an integration as above include a combination of a liquid discharge head and a functional component or mechanism secured together, for example, by fastening, bonding, or engaging, and a combination of a liquid discharge head and a functional component or mechanism, in which one of the liquid discharge head and the functional component or mechanism is retained movably to the other. A liquid discharge head and a functional component or mechanism may be detachably attachable to each other.

Like the liquid discharge device 440 illustrated in FIG. 14, for example, a liquid discharge head and a head tank are integrated together as a liquid discharge device. For example, a liquid discharge head and a head tank mutually connected through a tube are integrated together as a liquid discharge device. Such a liquid discharge device can have a unit including a filter between the head tank and the liquid discharge head.

For example, a liquid discharge head and a carriage are integrated together as a liquid discharge device.

For example, a liquid discharge head and a main scanning movement mechanism are integrated together as a liquid discharge device, with the liquid discharge head retained movably by a guide member as part of the main scanning movement mechanism. For example, as such a liquid discharge device as illustrated in FIG. 15, a liquid discharge head, a carriage, and a main scanning movement mechanism are integrated together.

For example, a liquid discharge head, a carriage, and a maintenance mechanism are integrated together as a liquid discharge device, in which a cap member as part of the maintenance mechanism is secured to the carriage to which the liquid discharge head is attached.

For example, as such a liquid discharge device as illustrated in FIG. 16, a liquid discharge head and a supply mechanism are integrated together, with a tube connected to the liquid discharge head to which a head tank or a channel component is attached.

Such a main scanning movement mechanism as above includes a guide member as a single item. Such a supply mechanism as above includes a tube as a single item and a holder as a single item.

The "liquid discharge head" is not limited in terms of a pressure generator to be used. For example, instead of such a piezoelectric actuator as described in the above embodiment (or a multilayered piezoelectric element), used may be a thermal actuator employing a thermoelectric conversion element, such as a heat-generating resistor, or an electrostatic actuator including a diaphragm and opposed electrodes.

In the present specification, the terms "image forming", "recording", "printing", "image printing", "print", and "shaping" are synonymous.

The liquid discharge head according to the present embodiment can improve reliability while reducing tensile stress generated in the piezoelectric member. The liquid discharge head can increase a discharge droplet and improve discharge characteristic.

Aspect 1

A liquid discharge head (1) includes: a chamber substrate (100): a diaphragm (13) on the chamber substrate: a lower electrode (10) on the diaphragm (13): a piezoelectric member (20) on the lower electrode (10): an upper electrode (11) on the piezoelectric member (20); wiring (42) electrically connected to the upper electrode to transmit driving signal to the piezoelectric member (20): and a nozzle substrate (300) having a nozzle (16).

The chamber substrate (100) includes an individual chamber (15) facing the diaphragm (13), the individual chamber (15) has polygonal shape having four or more sides, the piezoelectric member (20) has polygonal shape having four or more sides, the wiring (42) covers a middle point (bp) of a first side (15-2) of the four or more sides of the individual chamber (15), and a distance A is smaller than a distance B, where the distance A is between a first end portion (15*a*) of the individual chamber (15) and a second end portion (20*a*) of the piezoelectric member (20) in a second side (15-1) of the four or more sides in which a distance L is the largest, and a distance B is between a third end portion (15*a*) of the individual chamber (15) and a fourth end portion (20*b*) of the piezoelectric member (20) in a third side (15-3, 15-4) of the four or more sides in which the distance L is the smallest, and the distance L is a distance from the middle point (bp) of the first side (15-2) to each of middle points (mp) of the four or more sides other than the first side (15-2).

Aspect 2

In the liquid discharge head according to Aspect 1, multiple sides in the four or more sides have the largest distance L.

Aspect 3

In the liquid discharge head according to Aspect 1, multiple sides in the four or more sides have the smallest distance L.

Aspect 4

In the liquid discharge head according to Aspect 1, each of the individual chamber (15) and the piezoelectric member (20) has a curved corner between the second side and the third side.

Aspect 5

In the liquid discharge head according to Aspect 3, wherein the curved corner has distance C between a fifth end portion of the individual chamber (15) and a sixth end portion of the piezoelectric member (20), and the distance C is larger than the distance A and smaller than the distance B.

Aspect 6

In the liquid discharge head according to Aspect 1, further includes a channel (68) communicating with a common chamber (18); and a connection (15*b*) connecting the channel (68) and the individual chamber (15). The connection (15*b*) covers another middle point of the second side (15-1) opposite to the first side (15-2).

Aspect 7

In the liquid discharge head according to Aspect 2, further includes a channel (68) communicating with a common chamber (18); and a connection (15*b*) connecting the channel (68) and the individual chamber (15). The connection (15*b*) covers the curved corner opposite to the first side (15-2).

Aspect 8

In the liquid discharge head according to Aspect 1, the individual chamber (15) has a rectangular shape.

Aspect 9

In a liquid discharge device includes the liquid discharge head according to Aspect 1.

Aspect 10

In the liquid discharge device according to Aspect 8, further includes at least one of: a head tank storing liquid to be supplied to the liquid discharge head: a carriage on which the liquid discharge head is mounted: a supply mechanism configured to supply the liquid to the liquid discharge head: a maintenance mechanism configured to maintain the liquid discharge head: or a main scanning movement mechanism configured to move the liquid discharge head in a main scanning direction, combined together with the liquid discharge head to form a single body.

Aspect 11

In a liquid discharge apparatus includes the liquid discharge device according to Aspect 9.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge head comprising:

a chamber substrate;

a diaphragm on the chamber substrate;

a lower electrode on the diaphragm;

a piezoelectric member on the lower electrode;

an upper electrode on the piezoelectric member;

wiring electrically connected to the upper electrode to transmit driving signal to the piezoelectric member; and a nozzle substrate having a nozzle, wherein the chamber substrate includes an individual chamber facing the diaphragm, the individual chamber has a polygonal shape having four or more sides, the piezoelectric member has a polygonal shape having four or more sides, the wiring covers a middle point of a first side of the four or more sides of the individual chamber, and a distance A is smaller than a distance B, where the distance A is between a first end portion of the individual chamber and a second end portion of the piezoelectric member in a second side of the four or more sides in which a distance L is the largest, and a distance B is between a third end portion of the individual chamber and a fourth end portion of the piezoelectric member in a third side of the four or more sides in which the distance L is the smallest, and the distance L is a distance from the middle point of the first side to each of middle points of the four or more sides other than the first side.

2. The liquid discharge head according to claim 1, wherein multiple sides in the four or more sides have the largest distance L.

3. The liquid discharge head according to claim 1, wherein multiple sides in the four or more sides have the smallest distance L.

4. The liquid discharge head according to claim 1, wherein each of the individual chamber and the piezoelectric member has a curved corner between the second side and the third side.

5. The liquid discharge head according to claim 4, wherein the curved corner has distance C between a fifth end portion of the individual chamber and a sixth end portion of the piezoelectric member, and the distance C is larger than the distance A and smaller than the distance B.

6. The liquid discharge head according to claim 1, further comprising:

a channel communicating with a common chamber; and a connection connecting the channel and the individual chamber, wherein the connection covers another middle point of the second side opposite to the first side.

7. The liquid discharge head according to claim 4, further comprising:

a channel communicating with a common chamber; and a connection connecting the channel and the individual chamber, wherein the connection covers the curved corner opposite to the first side.

8. The liquid discharge head according to claim 1, wherein the individual chamber has a rectangular shape.

9. A liquid discharge device comprising the liquid discharge head according to claim 1.

10. The liquid discharge device according to claim 9, further comprising at least one of:

a head tank storing a liquid to be supplied to the liquid discharge head;

a carriage on which the liquid discharge head is mounted;

a supply mechanism configured to supply the liquid to the liquid discharge head;

a maintenance mechanism configured to maintain the liquid discharge head: or a main scanning movement mechanism configured to move the liquid discharge head in a main scanning direction, combined together with the liquid discharge head to form a single body.

11. A liquid discharge apparatus comprising the liquid discharge device according to claim 9.

* * * * *